METHOD OF MANUFACTURING A PHOTORESPONSIVE DEVICE
COMPRISING A PHOTORESPONSIVE PBO LAYER
Filed March 10, 1964 4 Sheets-Sheet 1

INVENTOR.
EDWARD F. DE HAAN
PAULUS PH. M. SCHAMPERS
JOHANNES H.N VAN VUCHT
BY
AGENT

EDWARD F. DE HAAN INVENTOR.
PAULUS PH.M. SCHAMPERS
JOHANNES H.N. VAN VUCHT
BY
Frank R. Trifari
AGENT INVENTOR.
EDWARD F. DE HAAN
PAULUS PH.M. SCHAMPERS
JOHANNES H.N. VAN VUCHT
BY
Frank R. Trifari
AGENT EDWARD F. DE HAAN INVENTOR.
PAULUS PH.M. SCHAMPERS
JOHANNES H.N. VAN VUCHT
BY
Frank R. Jufari
AGENT United States Patent Office 3,372,056

Patented Mar. 5, 1968

3,372,056

METHOD OF MANUFACTURING A PHOTORESPONSIVE DEVICE COMPRISING A PHOTO-RESPONSIVE PbO LAYER

Edward Fokko de Haan, Paulus Philippus Maria Schampers, and Johannes Hendrikus Nicolaas van Vucht, Emmasingel, Eindhoven, Netherlands, assignors to North American Philips Company, Inc., New York, N.Y., a corporation of Delaware Filed Mar. 10, 1964, Ser. No. 350,713

Claims priority, application Netherlands, Mar. 12, 1963, 290,119

30 Claims. (Cl. 117—200)

ABSTRACT OF THE DISCLOSURE

A method of making a photoresponsive device, in particular a television camera tube, employing a layer of PbO in which the PbO is vapor-deposited and subjected to the action of oxygen in combination with water vapor, hydrogen sulfide, tellurated or seleniated hydrogen to render the layer of PbO photo-sensitive.

Our invention relates to a photosensitive device and method of making the same. More particularly, the invention relates to a device comprising a layer of photosensitive, for instance photoconductive, material applied to a support by evaporation. The layer consists mainly of a metal-oxygen compound suitable, by the incorporation of impurities and/or deviations from the stoichiometry, to be rendered, at will, n-type or p-type conductive. The device also includes means for supplying an electric current to the photosensitive layer.

In this connection, a material is considered to be photosensitive when one or more electrical properties of the material are capable of being reversibly changed by irradiation with suitably chosen electromagnetic or corpuscular radiation; and, in the case in which the electrical conductivity of such a material is subject to change by such radiation, the material is said to be photoconductive.

Metal-oxygen compounds suitable for use as a photosensitive, and in particular a photoconductive material for such a device, are inter alia lead monoxide (PbO), bismuth trioxide ($Bi_2O_3$) and zinc oxide (ZnO).

In such photosensitive devices the layer of photosensitive material may be vapor-deposited on a surface of an insulating support, which is provided with one or more parallel, linear electrodes of metal, which may be electrically interconnected and which then constitute together a terminal. A second current supply member, or terminal, for the photosensitive layer may then be formed by similar, electrically interconnected electrodes, also provided on the support or on the surface of the layer remote from the support. In either case, they may be vapor-deposited and alternate with the first-mentioned electrodes. Alternatively the support may consist of a current-supply electrode for the photosensitive layer in the form of a continuous conducting substratum, in which case the current supply to the surface of the photosensitive layer remote from the support may also be performed by an uninterrupted, conducting layer. In the latter case the photosensitive layer with these two electrodes may constitute a photoconductive cell with a sandwich structure when the layer has continuous electrodes applied thereto in which case one or both electrodes may have to be transparent to electromagnetic radiation. Instead of supplying the current by means of an electrode which is applied to the whole or part of the surface of the photosensitive layer remote from the support, the current may be supplied to this surface by means of electrons emanating from an electron gun arranged opposite said surface of the photosensitive layer.

The device, according to the invention, is preferably of the latter type in which case it may form a vidicon camera tube in which the target plate vapor-deposited on a transparent signal electrode is formed by a layer of photoconductive material, of which the side remote from the signal electrode is to be scanned by an electron beam emanating from the electron gun of the tube.

For completeness sake, it should be noted that current may be supplied to the photosensitive layer of a device, as described, by means of electrodes provided only on the side of the layer remote from the support.

While the invention is about to be described in connection with a vidicon-type camera tube, it should be clearly understood that the principles discussed in this connection are applicable to other types of devices employing a photosensitive layer. The invention is, therefore, not limited to a vidicon-type camera tube but is defined with greater particularity in the claims following the specification.

It should be noted, for example, that it is not necessary to provide one or more electrodes, recognizable as such, of satisfactorily conducting metal for the current supply to the photosensitive layer. The photosensitive layer may, for example, constitute an electrical connection between various regions of a semi-conducting element serving as a support for the layer. It also should be noted that hereinafter in the description of the invention with particular reference to a device constituting a vidicon-type camera tube, in which the path of the electric current in the layer coincides with the direction of thickness of the photosensitive layer utilized in said device, reference is, for the sake of simplicity, often made to direction of thickness where direction of the current is intended. The considerations which refer to this direction of thickness may generally be applied to devices in which the current passes in the longitudinal direction of the layer, in which case, if we are in fact concerned with the direction of the path of the electric current, this direction of thickness finds its analogy in the longitudinal direction of the layer going from the positive current supply to the negative current supply or vice versa. Such an analogy applies, for example, to a device comprising a photosensitive layer provided with interlaced electrodes, the distance between the electrodes being great as compared with the thickness of the layer.

It is known that the photosensitive target plate of a camera tube of the vidicon-type must fulfill certain requirements in order for the tube to be suitable for practical use. The most important requirements are:

(1) A low dark current $i_d$: It may be said that with a voltage difference between the cathode and the signal electrode of 10 to 30 v., the dark current should not be more than $5\times10^{-9}$ a.;

(2) The capacity of the target place should lie between given limits: With an excessively small capacity the signal current obtained with scanning is too low, and with an excessively large capacity the scanning beam is not capable of replenishing, at an image point, the charge leaking away by conduction within a frame period, i.e. of stablizing the free surface of the target plate with a simple beam at cathode potential. A factor capable of affecting the capacity of the target plate is its thickness, because different absorptions of the material for radiations of different wavelengths the thickness of the target plate also affects the spectral sensitivity;

(3) A small time lag in photoconductive response, i.e. the electrical conductivity of the target plate follows satisfactorily rapidly variations in the exposure intensity;

(4) Sufficient lifetime: The tube must be capable of operating for a given number of hours before variations, particularly if the aforesaid properties occur to an extent such that the tube is no longer suitable for practical use for camera tubes for use in television studios. A lifetime of about 100 hours is, at present, considered to be acceptable; for industrial television in which the tube is usually operative for longer periods a lifetime of at least 1000 hours is desired;

(5) An adequate sensitivity to the image radiation penetrating through the signal electrode to the target plate: For visible light usually at least about 150 μa. per lumen of light with a color temperature of 2870° K. is desired. Moreover, the spectral sensitivity plays a role. For color television it is important to have a camera tube available which has a reasonable sensitivity in every part of the visible spectrum.

It is known that for camera tubes having a photosensitive target plate consisting of a polar substance, particularly lead monoxide (PbO), a low value of the dark current can be obtained by providing in the target plate one or more planar p-n junctions extending parallel to the plane of the target plate, each junction being obtained by joining two zones of target plate material lying one after the other in the direction of thickness and being of opposite conductivity type. Preferably the target plate of this known tube is provided with a zone of p-conductive material on the side facing the electron gun, which zone joins, in the simplest case, a zone of n-type conductivity, in contact with the signal electrode. For a tube of this type with a target plate of lead monoxide, a zone of n-type conductivity material may be obtained by incorporating bismuth or antimony in the lead monoxide; whereas, a p-type conducting zone can be obtained by the incorporation of an excess quantity of oxygen or a metal, for example, silver into the lead monoxide.

We have found that the creation of a planar p-n junction formed by adjacent zones of opposite conductivity type in a comparatively thin target plate, as commonly used in a vidicon camera tube, meets with technical difficulties, particularly with respect to its reproducibility. Moreover, such a target plate, because of the small thickness of the p-n junction, usually has too high a capacity and a low sensitivity. This may be understood when it is realized that the electric field in the target plate produced by the potential difference between the free surface of the target plate which is stabilized at cathode potential and the signal electrode, will prevail mainly across the thin p-n junction and that the further part of the thickness of the target plate will, for the major part, be field-free.

It is a principal object of our invention to provide a device employing a photosensitive layer which has a greatly improved response to radiation incident thereon.

A further object of our invention, in connection with a vidicon camera tube, is to provide such a tube having an improved target.

A still further object of our invention, in particular with respect to a vidicon camera tube, is to provide a target for such a tube in which the dark current is kept to a minimum value.

Another object of our invention, in particular with respect to a vidicon camera tube, is to provide a target for such a tube having a greatly improved spectral response, particularly in the red region of the spectrum.

A further object of our invention, particularly with respect to a vidicon camera tube, is to provide a target for such a tube which can follow rapid variations in exposure intensity.

A still further object of our invention, also with respect to a vidicon camera tube, is to provide a target for such a tube which has a lifetime sufficient for most purposes.

And yet another object of our invention also with respect to a vidicon camera tube, is to provide a target for such a tube which has a reasonable sensitivity in every part of the visible spectrum so that the camera tube may be employed to televise color images.

And a still further object of our invention is to provide a method of manufacturing a photosensitive layer for such devices as a vidicon camera tube having greatly improved characteristics.

These and further objects of the invention will appear as the specification progresses.

In accordance with the invention, we have found first that a satisfactory sensitivity and a suitable capacity for the photosensitive layer can be obtained, if during operation the electrical field prevailing in the photosensitive layer extends over a large part of the path of the electric current in the part of the layer where the charge carriers released by the radiation furnish this current, and thus, is not restricted mainly to a small part of said path. Second, a relatively high speed response is obtained if the material of the photosensitive layer behaves mainly as intrinsic or nearly intrinsic conductive material. Third, the dark current can be reduced by providing photosensitive material which is p-conductive at the location of the negative current terminal (supply of electrons from the outside and/or drainage of holes from the material).

Thus, in accordance with the invention, we have found that the aforesaid objects and conditions are met if the material of the photosensitive layer, in a device of the aforesaid kind, exhibits intrinsic or nearly intrinsic conductivity over a distance of at least about 4μ in the direction of the electric current in the layer. This distance may be split up into different closely adjacent sections. The intrinsic or nearly intrinsic conductive material also joins or terminates in distinctly p-type conducting photosensitive material at the location of the negative current terminal to the layer and extends in the direction of the electric current over a distance which is small as compared with the first mentioned distance over which the material of the layer is intrinsic or nearly intrinsic conductive material. Preferably, the distance measured in the direction of the electric current in the layer, over which the photosensitive material has intrinsic or nearly intrinsic conductivity, forms a major part, preferably more than 90%, of the distance between the location of negative current terminal and source of positive current to the layer. This is almost always the case when the direction of the current in the layer extends in the longitudinal direction thereof and this may be the case when, for example with a camera tube of the vidicon type, the current passes in the direction of thickness of the layer. In the latter case, however, as is described in copending application Ser. No. 350,870, part of the photosensitive layer occupying a greater or lesser part of the overall thickness of the layer may have such a high p-type or n-type conductivity that this part is, in fact, only operative for the negative current supply or the positive current supply to the remaining part of the layer which, in fact, alone is effectively photosensitive. Such a high p- or n-type conductive part is then intended to operate as an optical filter which absorbs radiation of shorter wavelength to a greater extent than radiation of longer wavelength, so that the device exhibits a higher relative sensitivity to longer wavelengths than for shorter wavelengths with incident radiation passing through the said part of the layer operating as an electrode for the rest of the layer.

In a further aspect of the invention, the material of the photoelectrically conductive layer is more or less n-type conducting where it electrically contacts a positive electrode or terminal. The n-type conductivity of the photosensitive material is then restricted to the region immediately adjacent this positive electrode or terminal. Thus, in a vidicon type camera, in accordance with the invention, provided with a photosensitive layer comprising intrinsic or nearly intrinsic conductive material over the largest part of its thickness, the photosensitive material may exhibit n-type conductivity where it contacts the signal plate. The n-conductive character of the photosensitive material then is confined to only a small part of the thickness of the layer immediately adjacent the signal plate. Such n-type conductivity of the material contacting a positive electrode or current supply member is intended to restrict the injection of holes from the positive electrode into the photosensitive material, and accordingly is effective in obtaining a low dark current.

We have found that although vidicon type camera tubes embodying the invention attained many of the aforesaid objects, their lifetime could differ between individual tubes. Moreover, the speed of photoconductor response left something to be desired. The deficiency in desired lifetime became manifest in that the initially sufficiently low dark current increased in the course of operation to a value such that an undesirably high level of the dark current was reached prematurely. Elaborate research carried out by us has led to the assumption that various factors, probably working together, are responsible for this phenomenon. Among these factors may be mentioned loss of oxygen from the surface of the photosensitive layer during operation and the influence of impurities introduced during the vapor-deposition process into the photosensitive layer which impurities occur in small, practically unavoidable and hence usually not reproducible quantities in the evaporation space, or on the support. It is presumed, in particular, that water vapor, which can in practice not be completely eliminated from the evaporation space, is such an impurity, which acts as an n-former when incorporated in the photosensitive material.

Regardless to what extent the non-reproducibility of the lifetime as found is indeed due to these factors, it is nevertheless a fact that we have found that an improved and reproducible lifetime can be obtained without incurring a slow speed of response if in accordance with a further aspect of the invention, the intrinsic or nearly intrinsic conductivity of the material of the photosensitive layer is obtained by providing, in part of the layer concerned, a quantity of water distinctly in excess of the unavoidable quantity thereof as well as an excess quantity of oxygen capable of compensating or substantially compensating for that quantity of water. It is presumed that by intentionally incorporating an excessive quantity of water, which quantity considerably exceeds the small quantity of water which is unavoidable in practical manufacture and which is non-reproducible, and by compensating this comparatively high quantity of absorbed water by means of an additional quantity of incorporated oxygen, the speed of response is favorably affected. Moreover, the incorporation of additional oxygen in the layer postpones to a much later instant the appearance of detrimental effects of loss of oxygen during operation of the device.

It should be noted that in the foregoing, like hereinafter, reference is made to water absorbed in the photosensitive layer and to an additional quantity of oxygen. It cannot be said with certainty how this water and this oxygen are held in the layer. It is assumed that OH— ions, and certainly oxygen atoms, are incorporated in the photosensitive material, and therefore form part of the crystal lattice, and that probably part of the excess oxygen is absorbed at the surface of the crystals of the photosensitive material.

In accordance with a further feature of the invention, the distinctly p-type conductivity of the material at the area of the negative current supply may be obtained by incorporating in this material a smaller quantity of water and preferably a greater quantity of oxygen than in the adjacent material having the intrinsic or nearly intrinsic conductivity.

In a device, according to the invention, the photosensitive metal-oxygen compound preferably consists of lead monoxide (PbO), which results in a device, the sensitivity of which can be advantageously chosen in the visible part of the spectrum. In accordance with a further aspect of this embodiment of the invention, an increased sensitivity to red light can be obtained by providing the photo-sensitive layer not only with the metal atoms of the metal-oxygen compound, but also with a quantity of atoms of one or more elements of the group consisting of sulphur, selenium and tellurium.

The invention also relates to a method of manufacturing a photosensitive device in which the photosensitive material is deposited on the support by evaporation in an oxygen-containing atmosphere. This method is intended to provide a technically acceptable way of manufacture of such devices with satisfactory reproducibility. According to this aspect of the invention, a layer of photosensitive material is applied to a support by evaporation in an oxygen-containing atmosphere. This layer consists mainly of a metal-oxygen compound suitable to be rendered, at will, n-type or p-type conducting by the incorporation of impurities and/or by deviations from the stoichiometry. At least that part of the photosensitive layer which extends over a distance of at least 4$\mu$ between the area of a negative current terminal and a positive current terminal is vapor-deposited in an atmosphere containing in addition to oxygen a gas (water-forming gas) of the group consisting of water-vapor, sulfurated hydrogen, seleniated hydrogen, tellurated hydrogen and mixtures thereof. The partial pressure of this water-forming gas is, at least at the beginning of the vapor-deposition of the said part, higher than $10\times10^{-5}$ mm. Hg and the partial pressures of the oxygen and the water-forming gas are adjusted relative to one another so that the part of the photoconducting layer forming during this deposition process behaves as intrinsic or nearly intrinsic conductive material. Measures are taken to render distinctly p-type conductive the photosensitive material at the area of the negative current terminal to the complete layer and the adjoining part thereof. The part of the photoconducting layer which is intrinsically or nearly intrinsically conductive may form the major part of the layer, but this is not necessary. As stated above, a part of the layer may have a relatively large dark electrical conductivity, particularly when the current passes in the direction of thickness of the layer, and this part may then serve as an electrode and as an optical filter. In the latter case, the aforesaid part of intrinsic or nearly intrinsic conductivity type will form the larger portion of the remainder of the photosensitive layer.

The term "water-forming gas" used in the preceding paragraph and to be used hereinafter for the gases of the latter group, is used for the sake of simplicity and should not be interpreted literally. If the oxygen-containing atmosphere in which the evaporation is carried out contains water-vapor, it may certainly be presumed that water will be incorporated in the photosensitive layer. If one or more other gases of the latter group are employed, it may be assumed that the reaction of these gases with the vapor-deposited metal-oxygen compound also results in the incorporation of water in the photosensitive layer, although we cannot prove this with certainty.

The method described above yields improved reproducible results because in contradistinction to the known method in which the photosensitive material is vapor-deposited in an atmosphere containing only oxygen, with or without an inert gas, for example argon, the partial pressure of the oxygen is less critical. In the process in which, for example, lead monoxide is vapor-deposited in an atmosphere containing only oxygen, the oxygen pressure must be held extremely accurately at a low value of about $1\times10^{-5}$ mm. Hg in order to obtain a layer satisfying subsequent to the deposition, the requirements of capacity and speed of response referred to above, since small deviations in the oxygen pressure result in the material of the layer becoming distinctly n-type or p-type conductive. However, also in the case of a presumably correct, and non-varying pressure, the results are not always reproducible. We have found that the evaporation space contains, even after the degassing process, substantially always a small quantity of water vapor, the pressure of which normally does not exceed 1 to 3 $10^{-5}$ mm. Hg. It is this water vapor, which is unavoidably and unintentionally present, which we believe results in such non-reproducible results. With the method according to the invention, however, an otherwise required critical adjustment, and one made only with great difficulty, of the oxygen pressure is avoided and, in addition, the influence of the water vapor in the evaporation space is reduced. In fact, in this method, a quantity of vapor or gas, resulting in the incorporation of water or, presumably to the formation of water in the layer of photosensitive material, is intentionally introduced into the evaporation space, which quantity is several times larger than the quantity of the practically unavoidable quantity of water vapor, so that variations of the latter quanity are no longer important. In accordance with the invention, this effect already can be obtained with a minimum pressure of the water-forming gas of $10\times10^{-5}$ mm. Hg; it is, however, advantageous to choose a higher partial pressure of the water-forming gas. Therefore, in accordance with a further aspect of this method, according to the invention, the gas atmosphere in the evaporation space consists, at the beginning of the vapor-deposition process of the intrinsically or nearly intrinsically conductive part of the photosensitive layer, of a water-forming gas-oxygen mixture having an overall pressure of at least $150\times10^{-5}$ mm. Hg, the partial pressure of the water-forming gas being 20 to 80% thereof. In accordance with a still further aspect of the invention, reproducible results are obtained most easily when the water-forming gas oxygen mixture has a total pressure between $1000\times10^{-5}$ and about $2200\times10^{-5}$ mm. Hg, the partial pressure of the water-forming gas being 20 to 60% thereof. In the latter case, the percentage attributable to the water-forming gas is lower with a higher total pressure.

In practice, the pressure in the evaporation space cannot be raised arbitrarily because above a given limit only a small quantity of the metal-oxygen compound to be evaporated from the usual crucible reaches the support. With a distance between the crucible and the support of about 40 mm., which distance is suitable for the manufacture of a helium pick-up tube having a window of a diameter of 2.5 to 3 cm., the upper limit of the gas pressure in the evaporation space lies at about $2500\times10^{-5}$ mm. Hg.

The results obtained by the method, according to the invention, are more favorable, with respect to reproducibility, when the total gas pressure in the evaporation space is not too low. It has been found, however, that with higher gas pressures the part thereof due to pressure of the water-forming gas must be chosen lower in order to obtain optimum results. With a total gas pressure in the evaporation space of less than $1000\times10^{-5}$ mm. Hg a partial pressure of the water-forming gas of about 80% of the total pressure may be chosen. If the total gas pressure exceeds about $1000\times10^{-5}$ mm. Hg, such a high partial pressure of the water-forming gas often gives rise to an undesirably slow speed of response of the deposited photosensitive layer. This slow speed of response is more pronounced as the pressure of the water-forming gas in the evaporation space increases. We have found that with a total gas pressure in the evaporation space of more than about $1000\times10^{-5}$ mm. Hg, and a pressure of the water-forming gas of 70 to 30% thereof, the percentage being the lower the higher the total pressure is, a photosensitive layer can be produced which is suitable for use in a vidicon-type camera tube for normal television purposes (frame-period $\frac{1}{25}$ to $\frac{1}{30}$ sec.).

We have furthermore found that as measures are taken to suppress the dark current of the final photosensitive layer which are more effective the pressure of the water-forming gas becomes less critical. In this connection it has been stated above that a low dark current is favored by rendering the photosensitive material at the location of the negative current terminal distinctly p-type conductive as compared with the remaining material of the layer.

A local strong p-type conductivity of the photosensitive layer is preferably obtained by exposing the negative-current terminal part of the layer to an oxygen-ion or oxygen-atom bombardment. In accordance with a further aspect of the vapor-deposition method described above this may be partially achieved by reducing the ratio between the partial pressure of the water-forming gas and the partial pressure of the oxygen in the evaporation space during the deposition of the intrinsically or nearly intrinsically conductive part of the photosensitive layer. The reduction of that ratio may be preformed either by increasing the oxygen pressure or by reducing the pressure of the water-forming gas, or by a combination of these two measures. It is advantageous to reduce the pressure of the water-forming gas in the evaporation space so that the vapor-deposition of the photosensitive material at the area of the negative current terminal of the completed photosensitive layer is performed in an atmosphere consisting principally of oxygen, and at the most such a small quantity of water-forming gas that the partial pressure of this gas does not exceed 2 to $3\times10^{-5}$ mm. Hg.

Besides favoring the formation of p-type conductive material towards the end of the deposition of the metal-oxygen compound, the reduction of the ratio between the partial pressures of the water-forming gas and of the oxygen during deposition of the photosensitive target plate of a camera tube, exhibits further advantages. It has been found that with this expedient, an increase in sensitivity and a reduction of photoconductive lag can be achieved. It is assumed that during the vapor deposition the temperature of the free surface of the photosensitive layer, as it increases in thickness, increases due to the gradually decreasing heat conduction towards the support. From this we can infer that as the deposited layer becomes thicker the quantity of absorbed additional oxygen decreases accordingly. This may be compensated for by increasing the oxygen pressure, that is a reduction of the aforesaid ratio, so that the quantity of absorbed additional oxygen and the quantity of absorbed water counterbalance each other as before with the exception of the very last part of the target plate, where the additional quantity of absorbed oxygen dominates to a greater or lesser extent in order to obtain the desired p-type conductivity.

It should be noted, here, that while we have advanced our reasons for believing what may be occurring in the manufacture of the layer in order to provide a suitable explanation, we, of course, do not wish to be bound by such explanations as they form no part of our invention.

It is possible to replace during, or subsequent to, the vapor-deposition of the intrinsically or nearly intrinsically conductive part of the photosensitive layer, the water-forming gas used in the first phase of the deposition of that part, by a water-forming gas of a different composition.

According to a still further aspect of the invention, is is not strictly necessary in the manufacture of the photosensitive device of the kind described that a water-forming gas be employed during the vapor-deposition of the photosensitive layer like in the aforesaid method according to the invention. This gas may be brought into contact with the already deposited material of the photosensitive layer in a separate process. In order to ensure distinctly p-type conductivity of the material of the layer where electrons are supplied to the layer in the operation of the device (that is at the location of the negative current terminal), this separate process may be carried out in between, that is on a photosensitive layer not yet completely deposited, after which exposure the deposition of the layer is completed accordingly. In this method, at least a portion of the photosensitive layer, which portion extends over a distance of at least 4μ between the areas of the negative current terminal and positive current terminal, is vapor-deposited in an atmosphere containing oxygen, and if desired, a water-forming gas and/or an inert gas, the latter at a pressure of less than $2000\times10^{-5}$ mm. Hg and the partial pressure of the oxygen is at least $100\times10^{-5}$ mm. Hg and the partial pressure of any water-forming gas present preferably does not exceed the oxygen pressure. The material thus deposited on the support is exposed, if necessary at a higher temperature, to a gas atmosphere containing oxygen and a gas (water-forming gas) of the group consisting of water vapor, hydrogen sulphide, seleniated hydrogen, tellurated hydrogen or mixtures thereof. The total pressure of this gas atmosphere is at least $150\times10^{-5}$ mm. Hg, while the partial pressure of the water-forming gas lies between 20 and 50% of said total pressure. After this treatment, the photosensitive material is rendered distinctly p-type conducting at the location of the negative current terminal to the layer.

Prior to the latter treatment, a portion of the layer may be deposited in an oxygen atmosphere free of water vapor.

In a still further embodiment of the method according to the invention which has been described, the exposure of the vapor-deposited layer to an atmosphere containing water-forming gas is carried out after the photosensitive layer has been deposited completely or substantially completely. Furthermore, at the location of the negative current terminal the layer is exposed to a bombardment of oxygen atoms or oxygen ions. As a result of this bombardment, an additional quantity of oxygen is introduced into the bombarded surface of the layer over a depth of 10 to 200 A. Such a bombardment may be carried out by means of a gas discharge in an oxygen-containing atmosphere, while the part of the photosensitive layer being bombarded constitutes one of the electrodes for the gas discharge. Such a bombardment may also be achieved by disposing an electrically heated body, for example an incandescent wire, in an oxygen atmosphere at a pressure of 4000 to $6000\times10^{-5}$ mm. Hg opposite the parts to be bombarded, this body imparting a high thermal velocity to the oxygen atoms. In both cases, it may be desirable to cool the support. For example in the case of linear negative electrodes, the surface parts not to be exposed to the bombardment can be screened by a mask.

While, in principle, the oxygen bombardment of the vapor-deposited, photosensitive layer may precede the exposure of the layer to a gas atmosphere containing oxygen and a water-forming gas, the layer first may be exposed to the water-forming gas, after which the oxygen bombardment is carried out. It is more preferable for obtaining the desired result to carry out the oxygen bombardment more than once and to bring the photosensitive layer in between such bombardment in contact with a gas atmosphere containing oxygen and a water-forming gas. Since the oxygen bombardment introduces a sufficient quantity of oxygen into the surface, it is not always necessary to expose the photosensitive layer to an atmosphere containing oxygen as well as the water-forming gas, which means that this atmosphere may consist substantially only of water-forming gas.

It should be noted that an oxygen bombardment of the vapor-deposited photosensitive layer, or parts thereof, for obtaining locally surface portions containing a relatively large quantity of additional oxygen, and therefore being distinctly p-type conductive is, in accordance with the invention, very suitably combined with the first method referred to above, in which during at least part of the vapor-deposition process the evaporation space contains an intentionally provided quantity of water-forming gas.

A further possibility of providing the desired p-type conductivity in the photosensitive layer at the location of the negative current supply consists in a locally restricted, relatively heavy doping on the layer with thallium. In accordance with the invention, this can be achieved, not only in combination with the first method referred to above in which water-forming gas is purposely present in the evaporation space with the exception of the last part of the vapor-deposition process, but also in combination with the other method referred to above in which the photosensitive layer which is not yet completely deposited is exposed to a gas atmosphere containing oxygen and a water-forming gas. In this case the relevant part of the photosensitive layer having a thickness of about 100 A. is deposited by evaporating the metal-oxygen compound in an oxygen-containing atmosphere only, while thallium or a thallium compound, for example thallium oxide is added to the metal-oxygen compound to be evaporated. The latter addition should be more than 0.5% by weight, preferably 3% by weight of the material to be evaporated.

In the methods briefly described above, and in further aspects thereof, it is important that after the completion of the vapor-deposition of the photosensitive layer, or after the formation of the desired p-type conductive material at the location of the negative current terminal to the layer, a thermal baking treatment at a comparatively high temperature is dispensed with, and must even be considered to be undesirable. Such a thermal baking treatment forming the last stage in known methods of manufacturing photoresistive layers by vapor-deposition does not yield reproducible results and we have found that this treatment is, for reasons not yet conducive to the formation of so-called white spots. White spots means that the electric signals generated by such a camera tube produced when supplied to a cathode-ray tube, a picture having white spots due to a local high dark current in the target plate. Since in the method, according to the invention, a final treatment at a raised temperature of the photosensitive layer is not carried out, such white spots are not any substantial source of trouble in a photosensitive device, i.e. vidicon type camera tube, manufactured in accordance with the invention. Also, for other reasons, a last step baking treatment of the photosensitive layer is undesirable since this might neutralize completely, or partly, the desired difference in type of conductivity between the bulk of the material of the layer and the terminal materials, i.e. at the location of the negative and positive current terminals, respectively.

The invention will be more fully described with reference to the accompanying drawing in which.

Figure 3A:
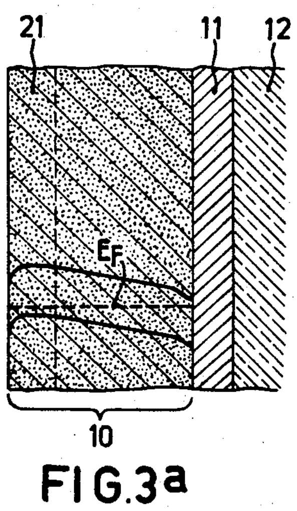
Figure 3B:
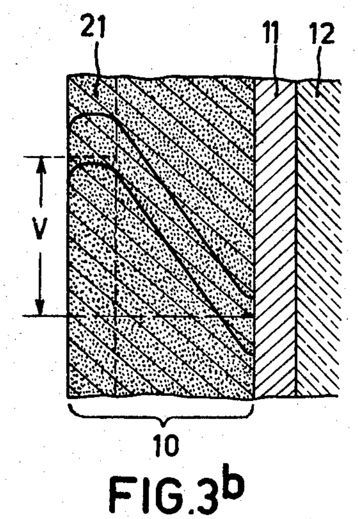
Figure 4:
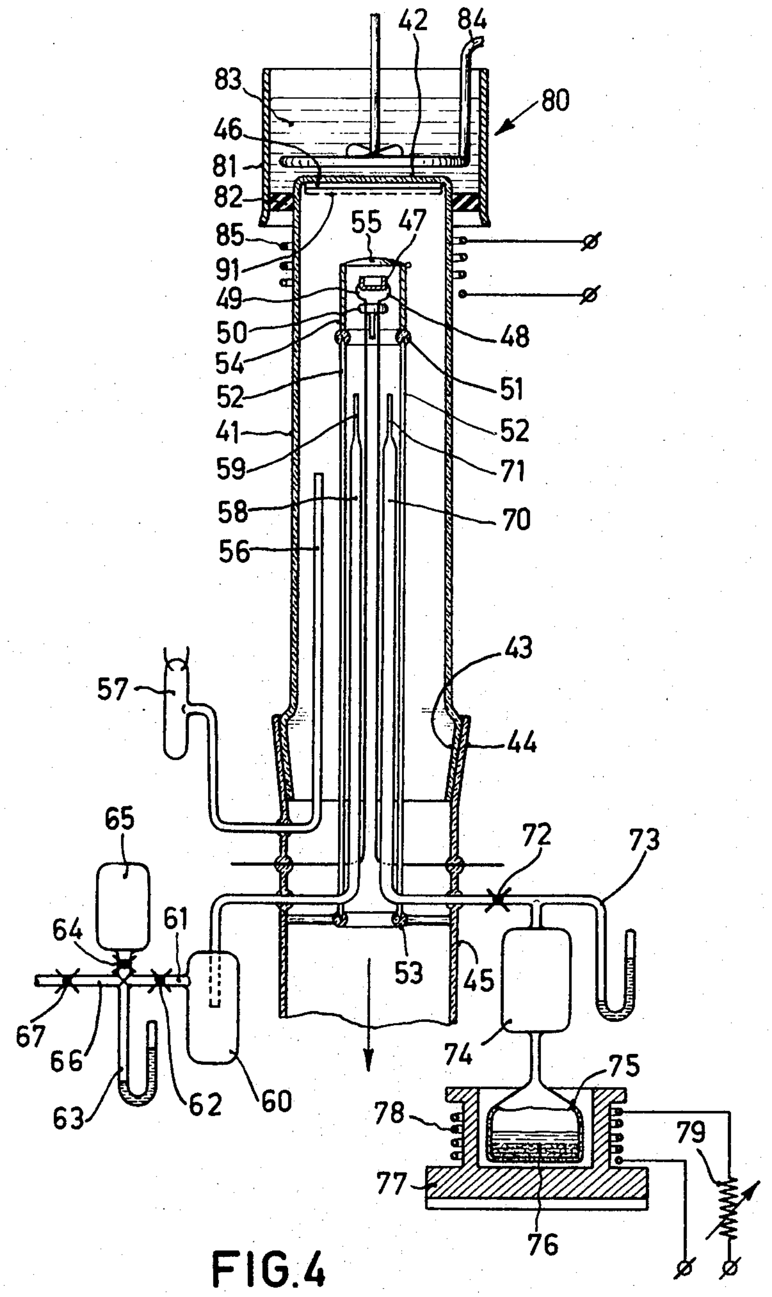
Figure 5:
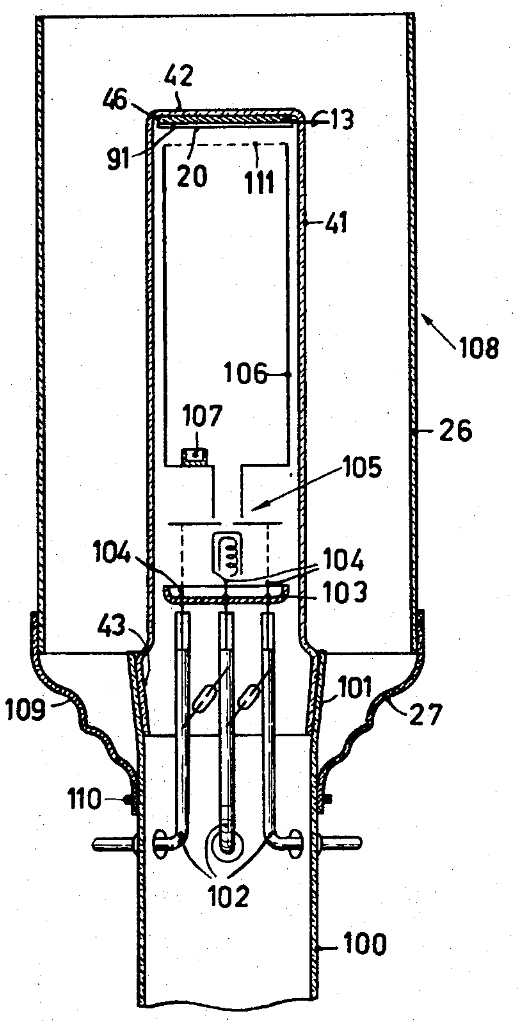
Figure 6:
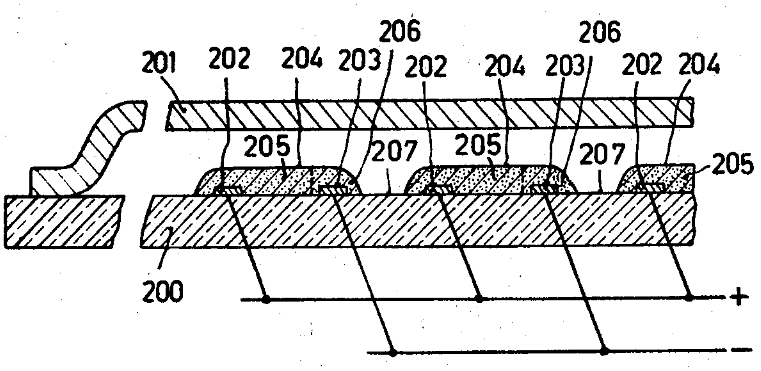

FIGS. 3*a* and 3*b* show diagrammatically the energy spectrum of the electrons across the thickness of this target plate without, and with, a voltage applied to the signal electrode during the operation of the tube;

FIGS. 4 and 5 illustrate embodiments of methods according to the invention for the manufacture of camera tubes; FIG. 4 shows a stage of the vapor-deposition process of the target plate material and the device to be used therefor; FIG. 5 shows a subsequent stage preceding the hermetic sealing of the camera tube;

FIG. 6 is a cross sectional view of part of a photoconductive cell; and

Figure 7:
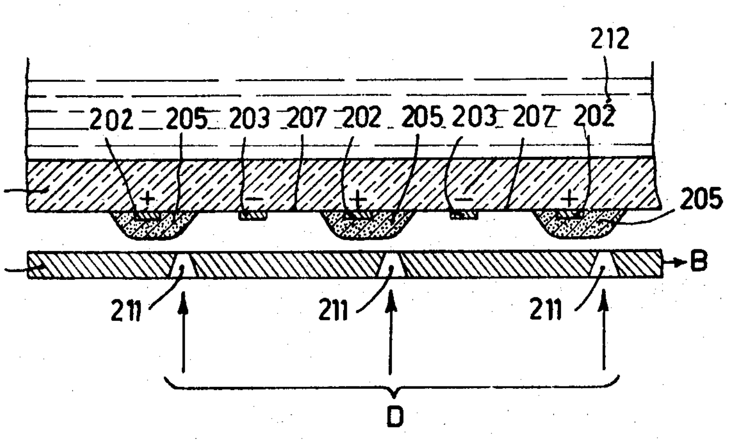

FIG. 7 shows a stage during manufacture of this cell.

Figure 1:
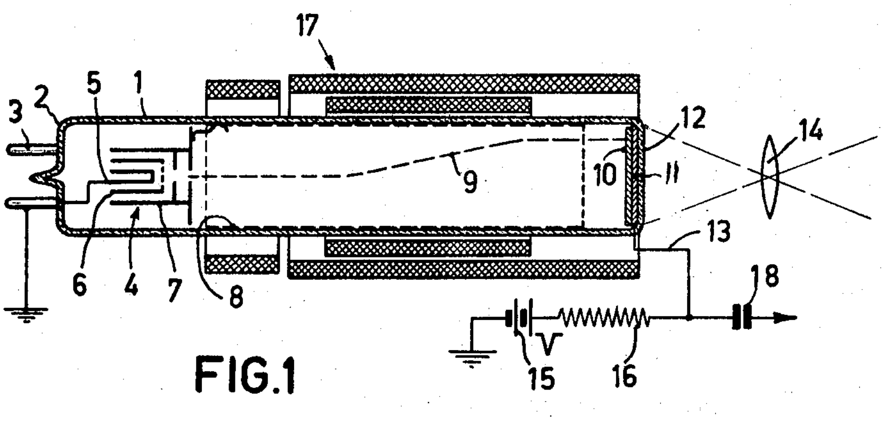
FIG. 1 shows diagrammatically a longitudinal sectional view of a camera tube embodying the invention.
Figure 2:
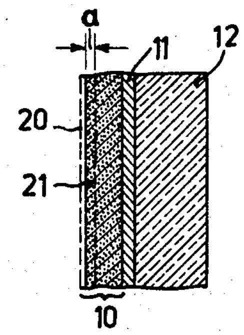
FIG. 2 shows part of the section of the target plate of this tube.

The camera tube shown in FIGS. 1, 2 and 3 comprises an exhausted, elongated, cylindrical bulb 1 of glass, the left-hand end of which is closed by a glass base 2 through which connecting pins 3 extend. The connecting pins are connected to various parts of an electrode system 4, mounted in this end of the glass bulb 1. This electrode system, shown diagrammatically and comprising inter alia a cathode 5, a control-grid 6 and a perforated anode 7, which is electrically connected to a wall electrode 8, is capable of producing an electron beam 9, for scanning a photosensitive target plate 10 at the other end of the bulb 1. The target plate 10 consists of a layer of lead monoxide (PbO) having a thickness of, for example 10 to 20$\mu$, and which was vapor-deposited on a transparent electrically conductive signal electrode 11, which extends along the inner side of the window 12, formed by the right-hand end of the bulb 1. The signal electrode 11 may consist of a very thin layer of vapor-deposited metal, for example gold; it is more commonly formed by a thin layer of conductive tin oxide. A current supply conductor 13, taken through the wall of the bulb, is connected to signal electrode 11. It should be noted that the thickness of the target plate may exceed the value referred to above by way of example as 10 to 20$\mu$. Thus, with a tube, intended primarily for processing a picture formed by X-rays, a greater thickness, for example up to 200$\mu$, is advantageous. The target plate may be thicker for other reasons. For example, between a layer of photosensitive material corresponding to the target plate 10 to be described hereinafter with reference to the embodiment shown in FIGS. 1 to 3 and the signal electrode 11, a layer of similar photosensitive material exhibiting distinctly n-type conductivity may be sandwiched, this sandwiched layer operating as an optical filter and as a positive current terminal to the effective portion 10 of this thicker target plate.

In order to obtain electrical signals corresponding to a picture, which by means of an optical system represented in FIG. 1 by a lens 14, is projected through the window 12 and the signal electrode 11 onto the target plate 10 of the tube, suitable voltages are applied to the electrodes of the system 4, while by means of a voltage source 15, via a signal resistor 16, the signal electrode 11 receives a positive voltage V with respect to the cathode 5 of 10 to 100 v. for instance, 30 v. By means of conventional deflection and focusing coils surrounding the tube (shown in FIG. 1 in common and designated by 17) the electron beam 9 is caused to move so as to scan the free surface of the target plate 10. During scanning this surface is stabilized each time at the potential of the cathode 5, while an electrical signal is produced, which can be derived through a capacitor 18 from the signal resistor 16.

FIG. 2 shows, on an enlarged scale, part of the section of the target plate 10, the signal electrode 11 and the window 12 of the tube shown in FIG. 1. It should be noted that the thickness of the various parts are not shown in the correct ratio and are greatly exaggerated in size for the sake of clarity. The target plate 10 consisting mainly of lead monoxide may be provided on the free surface, that is the surface scanned by the electron beam 9, with an extremely thin layer of vapor-deposited metal 20, for example silver. This layer 20 has a thickness of about 100 A., so that it has substantially no electrical conductivity in the direction of its plane. Such a metal layer 20 is, however, not required and may often be omitted, particularly when the surface of the target plate 10, as will be described hereinafter, has been exposed to an oxygen bombardment.

With the exception of a surface layer 21 of a thickness *a* (which is shown in FIG. 2 on a greatly enlarged scale) and a thin zone in contact with the signal electrode 11 the target plate consists of lead monoxide, which exhibits the type of electrical conductivity which would be found in intrinsic or nearly intrinsic lead monoxide. In reality, this part of the target plate does not consist of pure, intrinsic or nearly intrinsic lead monoxide, but of lead monoxide comprising intentionally a quantity of water exceeding the quantity thereof which in the deposition of the lead monoxide is in practice unavoidable. However, this intentionally incorporated quantity of excess water is compensated, or slightly overcompensated, by the simultaneous absorption of an adequate quantity of oxygen. The surface layer 21, however, consists of lead monoxide in which, by greater incorporatiton of excess oxygen and/or other suitable impurities, the influence of any water contained therein is overcompensated so that this surface layer is distinctly p-type conductive. The thickness *a* of the surface layer 21, as compared with the overall thickness of the target plate 10, is slight, here at the most 0.1 to 0.2$\mu$. The thickness *a* may be smaller if the lead monoxide of the surface layer 21 is more strongly p-type conductive. When this surface layer 21 is obtained, for example by bombardment with oxygen ions or high speed oxygen atoms, as described hereinafter, the layer 21 may have a thickness of not more than 20 to 200 A.

FIGS. 3*a* and 3*b* show the energy diagram of the electrons across the thickness of the target plate 10. FIG. 3*a* shows the same without potential difference, and FIG. 3*b* with a potential difference of V volts (signal electrode 11 at +V volts relative to the cathode 5 of the tube) between the free surface of the target plate and the signal electrode 11. In FIG. 3*a*, the Fermi level $E_F$ is indicated by a broken line. In the surface layer 21, where the lead monoxide is distinctly p-type conductive, a pronounced potential peak occurs. It is advantageous if at the side of the signal electrode 11, as is shown, a potential valley occurs. This is the case when the lead monoxide immediately adjacent the signal electrode 11 exhibits an n-type conductivity. This may occur automatically as a contact phenomenon, when the signal electrode 11 consists of conductive tin oxide, or another distinctly n-type conducting material, for example a metal such as lead, bismuth or antimony, which has an n-forming effect on the adjacent lead monoxide. Thus, with the exception of the surface layers of the target plate, the lead monoxide in the target plate appears intrinsically or nearly intrinsically conductive, which requires that for by far the major part of the target plate the storing capacity for space charge is small. As is illustrated, particularly in FIG. 3*a*, the space charge in the intrinsic part, by which the potential jumps in the surface layers are compensated, extends substantially throughout this intrinsic part.

With a voltage of V volts between the free surface of the target plate and the signal electrode (FIG. 3*b*) substantially the whole intrinsically or nearly intrinsically conductive part of the target plate takes this voltage as a result of this low storage capacity for space charge, while the electric field therein follows an approximately linear course. The height relative to the Fermi level of the potential peak in the surface layer 21 and also the depth of thte potential valley directly adjacent the signal electrode then remain substantially unchanged, so that these surface layers take no voltage or only a small part of the voltage V. The potential peak at the free surface of the target plate therefore constitutes a barrier for the electrons absorbed by the target plate during the scan of the electron beam 9 and thus impedes a dark current formed by electrons. On the other hand, the potential valley on the side of the signal electrode 11 constitutes a barrier for any holes tending to be injected into the target plate material from the signal electrode, so that in its entirety, this structure of the target plate ensures a low dark current, while the electric field produced by the voltage V across the target plate extends substantially throughout the thickness of the target plate. The latter provides a satisfactory sensitivity for image radiation which penetrates to a small depth as well as for radial ions which deeply penetrate into the target material, that is image radiation is absorbed, respectively, to a greater or to a lesser extent by the photosensitive material. On the other hand, the capacity of the target plate is, moreover, determined by substantially the whole thickness of the target plate, so that this capacity may have a really useful value.

Since the electric field in the target plate, due to the application of a voltage to the signal electrode 11, becomes manifest throughout the intrinsic or nearly intrinsic portion forming substantially the whole or by far the major portion of the target plate, substantially all charge carriers released from the target plate by incident radiation will produce an external current (that is in the circuit from signal electrode, via cathode to scanning beam). Consequently, in the example described, the whole target plate 10 may be considered to be "effectively operative." This need not always be the case, since the target plate may be formed by a layer of lead monoxide vapor-deposited on the signal electrode, said layer consisting, from the electrical point of view, of two different portions lying one after the other in the direction of thickness, i.e. a first portion on the side facing the electron gun and corresponding completely to the target plate 10 described above with reference to FIGS. 1 to 3 and a second portion between said first portion and the signal electrode and consisting of strongly n-type conducting lead monoxide which has consequently a relatively high electrical conductivity. Such a second portion with relatively high n-type conductivity may be obtained by incorporating, without compensation by oxygen in the lead monoxide in the deposition phase, a relatively large quantity of water or other impurity, giving rise to n-type conductivity, or a metal such as bismuth, or by depositing the lead monoxide of this portion with a deficiency of oxygen (deviation from the stoichiometry). The first mentioned portion corresponding to the target plate 10 constitutes the effectively operating portion of this, by its nature, thicker target plate, whereas the second, comparatively good conducting portion constitutes an optical filter and provides, at the same time, the positive current supply to the first mentioned portion. As stated above, the use of such a conducting layer operating as an optical filter is subject matter of our copending application Ser. No. 350,870.

A photosensitive device using lead monoxide exclusively as a photosensitive material exhibits a comparatively low sensitivity to red light. An improvement therein is obtained by providing, in accordance with the invention, in the effectively operating portion of the photosensitive layer a comparatively small quantity of sulphur, selenium and/or tellurium. Presumably, they are then formed mixed crystals of lead monoxide and lead sulphide, selenide and/or telluride. This absorption of sulphur, selenium or tellurium in the photosensitive layer consisting mainly of lead monoxide, for example in the target plate 10 described above, may be achieved for example by using sulphurated hydrogen, seleniated hydrogen and/or tellurated hydrogen in the vapor-deposition of the target plate in a manner to be described more fully hereinafter.

The electrical structure of the effectively operating portion of the photosensitive target plate of the examples described above may be termed p-i-n, wherein the i-region has a total thickness of at least 4 microns and constitutes by far the major part of the path of the electric current in this effectively operating portion. It is not necessary for the lead monoxide with intrinsic or nearly intrinsic conductivity type to be confined to a single region of appropriate extension in the direction of the electric current that is in this case the direction of thickness of the target plate. In general, the effectively operating portion of the photosensitive layer of the device, according to the invention, should have one or more thin p-type conducting regions. At least one such p-type region should be located at the area of the negative current supply to the layer. The layer should also have one or more i-regions, which taken together take up the major part of the path of the electric current in the effectively operating portion. There may be n-regions in the layer but these must not be considered to form part of the effectively operating portion of the photosensitive layer, if they have dimensions in the direction of the path of the current cannot be neglected. The effective portion of the photosensitive layer may have, going from the location of the negative current supply to that of the positive current supply, an electrical structure which can be characterized as p-i-p-i-n or p-i-n-p-i-n, the latter being a bivalent form of the structure of the target plate 10 described above. As a matter of course, a more than double structure is also possible. Example IX indicates the method by which such a sturcture can be obtained.

FIGS. 4 and 5 serve to illustrate a number of embodiments of methods according to the invention to be described hereinafter. These embodiments have in common the vapor-deposition of a target plate consisting mainly of lead monoxide on the window of a cylindrical part of a camera tube having a glass bulb (FIG. 4), this window being provided with a signal electrode and the subsequent movement of this bulb to a different pump system, which prior to that movement has been provided with a glass base which is sealed to the bulb, this base supporting the electrode system to be mounted in the tube (FIG. 5). These common features will be described first.

A long, cylindrical glass bulb 41, having a flat window 42, is provided at the open end with a ground cylindrical member 43, by means of which it can be arranged in a vacuum-tight manner in a ground fitting member 44 at the end of a duct 45 communicating with a vacuum pump (not shown). A signal electrode of the camera tube to be manufactured formed by a transparent electrode 46 of conductive tin oxide is provided on the inner side of window 42. At a distance of about 40 mms. beneath the electrode 46, a platinum evaporation crucible 47 is arranged in bulb 41 which crucible is supported by two current supply conductors 48 and 49 of different metals, for example platinum and a platinum-rhodium alloy. These conductors are embedded in a bridge piece 50, which is supported by a glass supporting ring 51 inside the bulb 41. This supporting ring is supported by a pair of rigid stay wires 52, which are secured in a ring 53, mounted inside the duct 45. The conductors 48 and 49 extend in an axial direction through the bulb 41 in downward direction and are taken separately through the wall of the duct 45. On the flat ground upper rim of the supporting ring 51 a glass cylinder 54 is disposed surrounding the evaporation crucible 47, which cylinder can be closed by a movable valve or lid 55 of magnetic material, preferably nickel, which is shown diagrammatically.

Through the wall of the duct 45 three glass tubes extend into the bulb 41 upwardly to approximately half the height thereof. The first tube 56 communicates outside the duct 45 with a vacuum meter 57, for example a Pirani-manometer. A second tube 58 terminates inside the bulb 41 in a capillary tube 59 and communicates outside the duct 45 via a vapor trap 60, which may be cooled by liquid air, with a duct 61 having a cock 62. This duct 61 communicates beyond the cock 62 with a manometer 63 and through a cock 64 with a container 65 containing oxygen and furthermore with a duct 66, which is closed by a cock 67. The third tube 70, which terminates inside the bulb 41 in a capillary tube 71, communicates through the duct 45 beyond a cock 72 with a manometer 73 and a vessel 74, serving as a buffer, which communicates with a vessel 75 containing a saturated aqueous solution 76 of lithium chloride. The vessel 75 is surrounded by a body 77 of satisfactorily thermally conducting material, for example copper. The body 77 is provided with a heating winding 78, which is connected via a variable resistor 79 to an electrical supply source. Instead of communicating with the vessel 75 containing lithium chloride solution, the buffer vessel 74 may communicate, if desired via a control-cock, with a different kind of container. The buffer vessel 74 may communicate furthermore, also through a control-cock, with a container containing a different water-forming gas or gas mixture of the kind referred to above, i.e. sulphurated hydrogen, seleniated hydrogen or tellurated hydrogen or a mixture of two or more of these gases. The upper portion of the bulb 41 with the window 42 is surrounded by a bath 80 consisting of a cylindrical sheath 81, having at the bottom a rubber stuffing ring 82. The sheath 81 contains a liquid 83, for example glycerine or silicone oil, which can be brought by means of a heating helix 84 to a predetermined temperature and be held there. The bulb 41 is surrounded at the level of the evaporation crucible 47 by a high-frequency heating coil 85, which may be connected to a high-frequency generator (not shown). By inductively heating a quantity of lead monoxide in the crucible 47 it can be vapor-deposited onto the window of the bulb 41. Before the disposition of lead monoxide in the trough 47, the bulb and all members contained therein may be degassed by heat by means of a furnace positioned for that purpose around the bulb 41, while the bulb is exhausted After, in a manner to be described hereinafter, lead monoxide from the crucible 47 has been deposited on the inner side of the window 42 carrying the signal electrode 46 and the target plate 91 thus formed has been processed further, as the case may be, and after the communication of the duct 45 with the vacuum pump (not shown) has been closed, the bulb 41 and the communicating part of the duct 45 is gradually filled with an inert protective gas until the pressure inside and outside the bulb is the same. This inert protective gas filling of the bulb 41 serves to protect the vapor-deposited target plate 91 on the signal electrode 46 from atmospheric influence during the transition of the bulb 41 to a further pump system shown in FIG. 5, where the electrode system with the electron gun is mounted in the bulb. This further pump system comprises a duct 100, which communicates with a vacuum pump (not shown) and the open upper end of which is formed by a ground member 101 in which the ground member 43 at the bottom of the bulb 41 fits. Through the wall of the duct 100 are taken separately a number of rigid current conveying wires 102, which extend upwardly inside the duct 100 and terminate at the level of the ground member 101. These ends of the current wires 102 are hollow and adapted to accommodate the lower ends of a number of connecting pins 104, arranged in a glass base 103. The glass base 103 supports an electrode system 105, which comprises an electron gun, shown only diagrammatically in FIG. 5. The cylindrical anode 106 of this system—which here replaces the wall electrode 8 of the tube shown in FIG. 1—may be provided with a miniature evaporation trough 107 formed by a folded sheet of tantalum, containing a few, for example 6 milligrams of silver. This trough is used to vapor-deposit an extremely thin layer of silver onto the target plate 91, if this is desired. In some cases, for example if, as will be described hereinafter, an oxygen bombardment of the vapor-deposited target plate is carried out, no silver layer is deposited on the target plate, although this is in principle not objectionable after such a bombardment.

The end of the duct 100 is surrounded by a spacious sheath 108, for example formed by a length of a cylindrical glass tube, which is held by means not shown, and is open at the top. The sheath surrounds the electrode system 105 and extends beyond it. On the lower side of the sheath 108 there is arranged a sleeve 109, for example of polyethylene, which is clamped around the duct 100, for example by means of a rubber ring 110.

Before the bulb 41 with the target plate 91, filled with a protective gas at atmospheric pressure is transferred from the duct 45 (FIG. 4) to the duct 100 (FIG. 5), the electrode system 105 is degassed. To this end an auxiliary bulb is disposed over this system, which bulb fits over the top end of the duct 100 and may have the same shape as the bulb 41. This auxiliary bulb is then exhausted and the electrode system 105 is subsequently degassed, for example by means of a furnace surrounding the auxiliary bulb, or by a high-frequency heating coil. Provision must be made, that if the evaporation trough 107 with silver is present, the heating thereof is not so strong that the silver will evaporate. After the degasification of the electrode system an inert protective gas, preferably a protective gas which can be gettered, for example nitrogen is passed through the duct 100 into the auxiliary bulb, while the pressure of this protective gas is continued, the auxiliary bulb used during the degassing process is lifted slightly from the end piece 101 of the duct 100—this may be facilitated by using a small excessive pressure of the protective gas—so that the protective gas flows slowly into the sheath 108 and supersedes the air contained therein for the major part. When the sheath is filled substantially completely with the protective gas, the auxiliary bulb is carefully removed in the upward direction and replaced by the bulb 41. To this end the bulb 41 is removed from the end of the duct 45 of the vapor-deposition pump system and transferred in upright position to the pump system having the electrode system 105, where the bulb 41 is slowly lowered over this system. If it is desired to apply a layer of silver to the target plate, the bulb 41 is exhausted as far as possible via the duct 100 and filled with oxygen at a pressure of 100 to $200\times10^{-5}$ mm. Hg. By inductive heating of the cylindrical electrode 106 at the area of the evaporation trough 107, the silver is evaporated and deposited through a metal gauze 111, closing the anode cylinder 106 at the upper end, onto the target plate 91. The window 42 of the bulb 41 is, if necessary, cooled, for example with the aid of a flow of air directed to this window. The quantity of silver in the trough 107 is proportioned so that a silver layer corresponding with the layer 20 of FIG. 2 is formed on the target plate 91; the thickness is about 100 A. The thickness of this layer must, at any rate, be so small that in the direction of its plane this layer exhibits substantially no electrical conductivity.

In the last stage of this pump system the bulb 41 is exhausted and then finished. The wall of the bulb 41 then is sealed to the upright rim of the glass base 103 in a conventional manner. The base 103 may be provided with an exhaust pipe having a spherical capillary, by means of which, on a further pump system any further treatment may be carried out, for example an activation of the getter in the bulb 41 and an optimum exhaustion for a longer time with simultaneous heating of the tube at, for example 100 to 150° C., while if desired the window can be cooled.

By means of the current conductors 102, which are electrically connected to the pins 104, after the exhaustion of the tube, the operation of the tube may be electrically checked, while furthermore in this stage, for example, the cathode wire may be activated.

The protective gas used in the bulb 41 and in the sheath 108 before and during the transfer of the bulb 41 to the pump system comprising the electrode system 105 serves firstly for protecting the vapor-deposited target plate 91 from the atmosphere and secondly to prevent the degassed electrode system 105 from absorbing troublesome gases from the open air. In this connection it should be noted that it is known to use as a protective gas during such a transfer a rare gas, for example argon or helium. In the present case, however, use is preferably made of a protective gas, any residues of which in the finished camera tube can be removed by gettering. It has been found that with the use of such a gas the lifetime of the tube may be longer than with the use of one of the rare gases. It is supposed that residues of the rare gases in the camera tube, since they are not removed by the conventional getters, produce ions during operation, which are likely to bombard the target plate, which thus loses oxygen. This loss of oxygen, particularly from the free surface of the target plate, may in the long run result in a rise in dark current.

It should be noted that the transfer of the bulb with the vapor-deposited target plate to a pump system having the electrode system (FIG. 5) while use is made of a protective gas, is given only as an example of a method of carrying out the invention. Instead of transferring the tube, the pump system where the vapor-deposition takes place, may be constructed so that the electrode system is arranged from the beginning in the same vacuum space as that used for the evaporation crucible, so that after the vapor-deposition process the evaporation crucible can be removed from the bulb 41 without interrupting the vacuum and the electrode system can be inserted instead. Such a method is described, for example, in British patent specification 853,070.

Furthermore, it should be noted that under certain conditions the use of a protective gas during the transfer of the tube from the pump system shown in FIG. 4 to the pump system of FIG. 5 can be omitted without harmful results. This may be the case, for example, if the surface of the photosensitive layer is subjected prior to the transfer to such an oxygen bombardment that a large quantity of additional oxygen is absorbed in the surface of the layer.

A few example of methods according to the invention for the manufacture of the target plate 91, which is intended to be effectively operative as a whole, by means of the device shown in FIG. 4 will now be described.

*Example I*

400 to 500 mg. of pure lead monoxide (PbO) were disposed in the evaporation crucible 47, the quantity being higher, if the pressure of the gas atmosphere in the bulb is higher, indicated hereinafter, at the beginning of the vapor-deposition process. The indicated quantity of lead monoxide is intended for a target plate of a diameter of about 3 cm. and a thickness of about 15 to 20$\mu$. For a target plate of greater thickness a correspondingly greater quantity of lead monoxide must be disposed in the crucible 47. This lead monoxide may, if necessary, have been evaporated previously and deposited in vacuum for purifying it. After the bulb 41 has been positioned on the duct 45, the coil 85 and the bath 80 were installed. The vacuum pump communicating with the duct 45 was actuated and in the meantime the heating winding 83 heated the bath 80 surrounding the window 42 to a temperature between 60° C. and 190° C., preferably about 120° C. Also the body 77 surrounding the vessel 75 containing the saturated lithium chloride solution was then heated in order to obtain a given water vapor pressure, for example about 12 mm. Hg in the buffer vessel 74.

After verification by means of the vacuum meter 57 that bulb 41 is, indeed, satisfactorily exhausted, oxygen was introduced into the bulb through the duct 45 by setting the cocks 64 and 61, while pumping was continued so that a constant pressure of the oxygen in the bulb was maintained, which pressure is at least $150\times10^{-5}$ mm. Hg, preferably 800 to $1000\times10^{-5}$ mm. Hg. By setting the cock 72 and by adjusting, if necessary, the temperature of the vessel 75, water vapor was introduced into the bulb 41. Of course, a different kind of container of water vapor may be used instead of the vessel 74, 75 with the saturated lithium chloride solution for introducing water vapor via the cock 72 into the bulb 41. The introduction of water vapor was controlled so that the water vapor amounted to at least 20% and at the most to 80% of the total pressure in the bulb resulting from the admission of both oxygen and water vapor; this percentage is lower, the higher the previously adjusted oxygen pressure is. With an oxygen pressure of 800 to $1000\times10^{-5}$ mm. Hg, the water vapor supply to the bulb 41 is preferably controlled so that a total pressure of about 1100 to $1300\times10^{-5}$ mm. Hg is attained.

By energizing the high-frequency heating coil 85 the evaporation crucible 47 was heated so that the lead monoxide melts and was then brought at a temperature at which this quantity of lead monoxide was evaporated in about 3 to 4 minutes, preferably in 180 to 200 seconds, that temperature having been previously determined experimentally by means of prior charges of the crucible 47 with the same quantity of lead monoxide. The temperature of the crucible 47 may be indicated by supporting wires 48 and 49, operating as a thermal element. As soon as the crucible had reached the desired evaporation temperature of the lead monoxide, the lid 55 which up to now closed the crucible 47 was lifted by means of a magnet arranged outside the tube (not shown), so that the lead monoxide could travel from the crucible 47 to the signal electrode 46. However, before the whole quantity of lead monoxide had evaporated, the supply of water vapor to the bulb 41 was reduced or blocked, for example by means of the cock 72, so that during the last stage of the vapor-deposition process the pressure of the water vapor in the bulb 41 decreased. This decrease should be such that, when the last part of the target plate is deposited, there should be substantially no longer any water vapor present, which means in this case that the water vapor pressure in the bulb 41 should not exceed $2\times10^{-5}$ mm. Hg and should preferably be lower. It also depends upon the pumping speed of the vacuum pump connected to the duct 45, at which instant after the beginning of the vapor-deposition, and to what extent the introduction of water vapor to the bulb 41 should be reduced. It has been found that a satisfactory target plate in the bulb 41 was formed, when the reduction of the water vapor pressure in the bulb started about 45 seconds after the start of the vapor-deposition, i.e. the lifting of the lid 55.

It is important that during the vapor desposition process described above for the lead monoxide from the crucible 47 onto the window of the bulb 41 that the window should be held at a temperature of not less than 60° C. and not higher than 190° C. At a temperature of less than 60° C. the deposited layer may assume a glassy structure, so that it is fairly transparent, which results in the sensitivity to visible image radiation being low. At a temperature exceeding about 190° C. the lead monoxide is deposited in comparatively large crystals of dimensions approximately equal to the thickness of the target plate. In the operation of the tube this produces a visible structure in the picture, while the risk of appearance of the above-mentioned "white spots" is greater. Therefore, during the vapor-deposition of the target plate the window is preferably held at a temperature lying between the aforesaid limits, for example at a substantially constant temperature of about 120° C.

After the whole quantity of lead monoxide has evaporated from the crucible 47, the high-frequency heating coil 85 was switched off and the oxygen supply to the bulb 41 was stopped by closing the cock 62. Moreover, the bath 80 was removed from the window 42. Then, the bulb was exhausted and filled with nitrogen of atmospheric pressure. Subsequently, the bulb was transferred in the manner described with reference to FIG. 5 to the device comprising the electrode system, where the tube is finished. The target may be provided in the manner described with an extremely thin silver layer.

*Example II*

In this example a quantity of pure lead monoxide was disposed in the crucible 47, which quantity was just not sufficient to deposit a complete target plate on the inner side of the window of the bulb 41, for example 90 to 99% of the quantity required for a complete target plate.

This lead monoxide was evaporated in the manner described in Example I and deposited onto the window of the bulb 41 in a gas atmosphere, which consisted at the start of the deposition process of a water vapor oxygen mixture of an overall pressure of 1000 to $1500\times10^{-5}$ mm. Hg, of which the oxygen pressure as 70 to 80%.

The water vapor pressure was therefore about $300\times10^{-5}$ mm. Hg. During the deposition process, like in Example I, the water vapor pressure in the bulb 41 was reduced, for example by closing the cock 72 to a given extent, so that at the end or towards the end of the vapor deposition of the last quantity of lead monoxide from the crucible 47 in the bulb 41 the gas consisted substantially only of oxygen, while the water vapor pressure in the bulb was at the most not much more than $2\times10^{-5}$ mm. Hg. After the whole quantity of lead monoxide was evaporated from the crucible 47, the inductive heating of said crucible was stopped, the liquid 83 of the bath 80 was brought to room temperature or replaced by a different liquid, for example water, of room temperature, and nitrogen was in the meantime introduced into the bulb 41 via the duct 45, the pressure of this nitrogen having been raised to the prevailing atmospheric pressure. Then the bath 80 and the coil 85 were removed and the bulb 41 was lifted into an upright position to a sufficient extent to introduce a new quantity of lead monoxide into the trough 47. This second charge of the crucible was considerable smaller than the first charge, for example 10 to 40 mg. It consisted, moreover, of lead monoxide with an addition of thallium oxide ($Tl_2O$). This addition may be a few percent by weight, preferably 3% by weight. The lid 55 was replaced in its position in which it covered the crucible 47 and the bulb 41 was lowered onto the end of the duct 45. The coil 85 and the bath 80 were replaced in their initial positions and the window 42 of the bulb was again heated to about 120° C. and held at this temperature. The bulb 41 was exhausted to the optimum vacuum via the duct 45 after which via the capillary 49 oxygen was introduced to an extent such that the pressure in the bulb was about $1000\times10^{-5}$ mm. Hg. In this stage of the manufacture of the camera tube water vapor was no longer introduced into the bulb. By energizing the coil 85, the contents of the crucible 47 were melted. By lifting the lid 55 with a magnet lead oxide with a proportional quantity of thallium was vapor-deposited onto the layer of lead monoxide previously applied to the window of the bulb. This vapor-deposition was terminated when a layer of a thickness of about a few hundred A. of thallium-doped lead monoxide had been applied to the portion of the target plate previously deposited. If a slightly excessive quantity of thallium-doped lead monoxide had been introduced into the crucible 47, this vapor-deposition could have been readily terminated by removing the magnet which holds the lid 55 opened, or alternately, by switching off the coil 85 in due time or by introducing, at the correct instant, such a quantity of oxygen into the bulb 41 that the pressure in the bulb rises rapidly to a value of about $3000\times10^{-5}$ mm. Hg so that lead monoxide no longer is evaporated from the crucible 47. The bath 80 and the coil 85 were again removed and, after exhaustion of the bulb 41, it was gradually filled with nitrogen and then transferred, in upright position, in the manner described above to the pump system shown in FIG. 5, where the tube was finished. If desired, an extremely thin silver layer could then have been applied to the target plate in the manner described above.

Instead of thallium oxide, a compound of a different element operating for the lead monoxide as a p-former, or such an element itself may be added to the lead monoxide in the crucible 47 for completing the vapor-deposition of the target plate. For example silver, copper, silicon dioxide, lead fluoride may be added to the lead monoxide. However, in view of obtaining the longest lifetime possible, thallium oxide is preferred.

*Example III*

As in Example II first a quantity of pure lead monoxide was disposed in the crucible 47, which quantity is slightly smaller, for example a few percent smaller, than the quantity required for vapor-depositing the complete target plate. This lead monoxide was thereafter vapor-deposited onto the signal electrode 46 in the bulb 41. This vapor-deposition step may, but need not be carried out, like in the preceding examples in an atmosphere which comprises besides oxygen, an intentionally introduced quantity of water vapor. The lead monoxide may, in this instance for example, be deposited in an atmosphere consisting of oxygen and, if desired, an inert gas, for example argon. This atmosphere may be obtained by introducing, subsequnent to evacuation of the bulb 41, via the duct 58 and the capillary tube 59, only oxygen and, if desired, via a further capillary tube, argon to an extent such that the oxygen pressure in the bulb amounts to a value between 100 and $200\times10^{-5}$ mm. Hg. After the vapor-deposition of the lead monoxide from the crucible 47 the bath 80 by means of which in this case the window of the bulb was held at a lower temperature than in the Examples I and II, which temperature was, however, now lower than 40° C., and the coil 85 were replaced by a furnace surrounding the bulb 41. After the oxygen atmosphere in the bulb 41 was replaced by a mixture of water vapor and oxygen with an overall pressure of 100 to $200\times10^{-5}$ mm. Hg, 30 to 40% of which results from the water vapor, the target plate deposited during the preceding stage was held by the furnace at a temperature of about 300° C. for about 30 minutes. As a result of this treatment, during which water-forming gas was absorbed in the deposited layer, the composition of the atmosphere in which the layer had been previously deposited was by itself of no great consequence. Therefore, this atmosphere might have contained, in addition to oxygen, an intentionally introduced quantity of water-forming gas, the partial pressure of which was below that of the oxygen. After the deposited layer was exposed as described to an atmosphere of water vapor and oxygen, the furnace was removed and the bulb 41, after being filled with nitrogen, at atmospheric pressure, was lifted into an upright position for a short time in order to introduce a small quantity, for example 10 to 40 mg. of pure lead monoxide into the crucible 47. Immediately thereafter the bulb was replaced upon the end of the duct 45, the bath 80 and the coil 85 were again replaced, positioned, and after optimum evacuation of the bulb 41 oxygen only was introduced, so that the pressure in the bulb was adjusted to 100 to $200\times10^{-5}$ mm. Hg. In this oxygen atmosphere, after the coil 85 was energized, an additional layer of lead monoxide was vapor-deposited onto the target plate previously deposited and treated as described above. The thickness of this additional layer was not more than 10%, preferably less than 1%, of the thickness of the finally obtained target plate. This additional layer preferably had a thickness of a few hundred A. The temperature of the bath 80 was adjusted to such a low value, for example less than 40° C. that the last-mentioned layer had a glassy structure, so that it operated as a protecting layer for the subjacent portion of the target plate. After the deposition of this additional layer, the bulb 41 was transferred to the pump system of FIG. 5, where the bulb was finished in the manner described, after an extremely thin layer of silver had first been deposited on the target plate. It should be noted that in this case, the use of a protective gas during the transfer may be dispensed with.

*Example IV*

A quantity of pure lead monoxide was disposed in crucible 47 sufficient for the formation of a complete target plate on the signal electrode 46 applied to the inner side of the window of the bulb 41. This lead monoxide was vapor-deposited onto the window held at a temperature of about 120° C. by the bath 80 in an atmosphere of water vapor and oxygen as indicated in Example I or the first part of Example II. With this deposition of the target plate, like in the Examples I and II, the pressure of the water vapor in the bulb 41 can be reduced so that the last portion of the target plate was deposited in an oxygen atmosphere substantially free of water vapor. In this example, however, a smaller reduction of the partial pressure of the water vapor during the deposition may suffice, for example a reduction to half the initial partial pressure of the water vapor. It is even not objectionable to have a constant pressure of the water vapor throughout the deposition process, which means that the composition of the gas atmosphere at the start can be maintained throughout the deposition process. This is permissible since in this example the target plate subsequent to deposition thereof was exposed to an oxygen bombardment, as a result of which such a quantity of oxygen was absorbed in the surface layer of the target plate that this surface layer obtained the required p-type conductivity. If the target plate material had been deposited in an atmosphere with a decreasing pressure of the water vapor during the deposition step, a shorter or less intensive oxygen bombardment might have sufficed than in the case in which the partial pressure of the water vapor was substantially constant throughout the deposition process.

The oxygen bombardment of the deposited target plate may be performed by means of a gas discharge in an oxygen atmosphere between the target plate and an electrode disposed opposite the target plate at a given distance therefrom. This gas discharge process may be performed subsequent to the deposition process with the arrangement shown in FIG. 4, while the evaporation crucible 47 serves as the electrode opposite the target plate. If the bulb 41 is filled with oxygen of a pressure of about $5000\times10^{-5}$ mm. Hg, favorable results are obtained with a current intensity in the target plate of about 8 $\mu$a. per cm.$^2$ (that is a total current of about 60 $\mu$a. for a target plate having a diameter of 4 cm.) for a period of 10 to 60 sec. In order to cause the gas discharge current to pass through the target plate, it will usually be necessary to illuminate this plate. The light of the gas discharge itself may contribute to sufficiently reduce the resistance of the target plate. The gas discharge may be produced, with the aforesaid oxygen pressure and with a distance between the evaporation crucible 47 and the target plate of about 40 mm. in the aforesaid arrangement, by a direct voltage of about 1000 v. in series with a series resistor having a value of about 6M ohms. It is the negative terminal of this source that is preferably connected to the signal electrode 46.

Of course, the gas discharge can be performed without using the arrangement shown in FIG. 4; the bulb 41 with the deposited target plate may first be transferred, while using a protective gas, for example nitrogen to a further pump system provided with an electrode adapted to be positioned opposite the target plate. The gas discharge need not necessarily be supplied by direct-current voltage; alternating-current voltages may yield similarly favorable results. The gas discharge may be unintensified or obtained solely by means of a high-frequency coil surrounding the bulb 41. It should be noted that the intended oxygen bombardment of the surface of the deposited target plate also may be obtained without using a gas discharge, although the gas discharge method, due to the facilities it offers and to its controllability, is to be preferred. It is possible, for example, to dispose in the bulb which for this purpose is then filled with oxygen of a pressure of 4000 to $6000\times10^{-5}$ mm. Hg opposite the target plate an electrically heated body (heated for instance inductively or by direct-current passage), for example an incandescent wire or a good conducting metal ring and to provide, by heating this body, that the target plate is bombarded with oxygen atoms having a high thermal velocity. The oxygen bombardment of the free surface of the target plate may also be performed subsequent to the transfer of the bulb to the pump system of FIG. 5. If the bombardment is carried out by means of a gas discharge, the electrode gauze 111, closing the anode cylinder 106, may be used as one of the electrodes for the gas discharge. If a thermal bombardment is to be carried out, the anode cylinder 106 can be heated by a high-frequency current to, for example 600° C. to 700° C. with an oxygen pressure in the bulb of about $5000\times10^{-5}$ mm. Hg. The duration of this treatment may vary between about 5 and about 25 minutes.

The bulb 41 was transferred, subsequent to the oxygen bombardment of the surface of the target plate, using nitrogen as a protective gas, to the pump system of FIG. 5, where it was finished in the manner described without the application of the extremely thin silver layer described above (the evaporation trough 107 need not be provided in this case). If the oxygen bombardment has been intensive and has been performed prior to the connection of the bulb with the pump system of FIG. 5, it will often be superfluous to use a protective gas.

*Example V*

About 450 mgs. of pure lead monoxide were disposed in crucible 47, which is sufficient to deposit a complete target plate of a thickness of about 20$\mu$ on the window of the bulb. This lead monoxide was vapor-deposited onto the window, the temperature of which was held at 40 to 60° C., but which temperature may possibly be higher, in an atmosphere consisting preferably of oxygen only plus, if necessary, an inert gas, that is an atmosphere similar to that used in the deposition of the major part of the target plate in Example III. Like in Example III the gas atmosphere may contain water vapor or a different water-forming gas within the scope of the invention. After the target plate had been completely deposited, it was exposed, as in Example III, to a mixture of water vapor and oxygen at a pressure of 100 to $200\times10^{-5}$ mm. Hg (20 to 40% which results from the water vapor pressure). This treatment was carried out at a temperature of 250 to 300° C. for a time of 50 to 30 minutes. After this treatment the surface of the target plate in the bulb 41 was subjected to an oxygen bombardment in the manner described in the second part of Example IV. After this bombardment the bulb was transferred to the pump system of FIG. 5, where the tube was finished without the deposition of an extremely thin silver layer on the target plate.

By the described exposure of the completely deposited target plate to a mixture of water vapor and oxygen, this plate most probably has a homogeneous composition. The target plate material then has conductivity properties as may be expected with lead monoxide which is intrinsically conductive or slightly p-type conductive. By the subsequent oxygen bombardment, the free surface of the target plate, i.e. only this surface, is made distinctly p-type conductive, so that the surface layer 21 shown in FIGS. 2, 3*a* and 3*b* was obtained. This p-type surface layer has a thickness of presumably not more than a few hundred A., as indicated above.

*Example VI*

In this example of a method according to the invention, the process is mainly like that of one of the Examples I, II and IV, the difference being, however, that the lead monoxide introduced in the crucible 47 was not deposited onto the signal electrode 46 in a gas atmosphere containing apart from oxygen only water vapor, but in a gas atmosphere consisting of oxygen and a water-forming gas mixture comprising substantially equal quantities of water vapor and sulfurated hydrogen ($H_2S$), seleniated hydrogen ($SeH_2$) or tellurated hydrogen. By way of example, use may be made of a gas atmosphere at an overall pressure of 1000 to $1200\times10^{-5}$ mm. Hg, of which at least at the beginning of the deposition process the partial pressure of the water vapor is about $200\times10^{-5}$ mm. Hg and the partial pressure of one of the other hydrogen compounds, for example $H_2S$ is about $200\times10^{-5}$ mm. Hg. However, as an alternative, the gas atmosphere may have an overall pressure of 300 to $400\times10^{-5}$ mm. Hg, while the partial pressure of the water vapor and that of the other hydrogen compound is about $50\times10^{-5}$ mm. Hg each. It may be advantageous to maintain the temperature of the window of the bulb 41, by means of the bath 80, not at the values indicated in the Examples I, II and IV of about 100 to 130° C., but at a lower value preferably of 60° to 70° C.

During the deposition of the lead monoxide the pressure of the water vapor and of one of the further hydrogen compounds constituting the water-forming gas may be reduced with respect to the pressure of the oxygen as described in Examples I and II, but the pressure of the water-forming gas may be also left constant, as described in Example IV and the deposited target plate may be then submitted to an oxygen bombardment as described above.

*Example VII*

This method is closely related to that of Example VI the difference being that whereas according to Example VI only a part of the water vapor in the gas atmosphere used during deposition of the lead monoxide in the Examples I, II and V was replaced by one of the mentioned other hydrogen compounds, this method of the present example utilized a gas atmosphere in which the water vapor was completely replaced by sulfurated hydrogen, seleniated hydrogen, tellurated hydrogen, or a mixture of two or more of these hydrogen compounds. This method may accordingly be carried out analogous to that described in Example VI although it is preferable to use a lower overall pressure of the gas atmosphere during the deposition process. For instance, satisfactory results may be obtained by depositing the lead monoxide in a gas atmosphere of an overall pressure of 300 to $500\times10^{-5}$ mm. Hg, in which the partial pressure of the aforesaid hydrogen compounds other than water is $200\times10^{-5}$ mm. Hg, the remainder being the partial pressure of oxygen. However, use may be made of an overall gas pressure of 600 to $700\times10^{-5}$ mm. Hg; the partial pressure of sulfurated hydrogen, seleniated hydrogen, tellurated hydrogen or a mixture thereof is about $80\times10^{-5}$ mm. Hg. It will be obvious that under the last-mentioned conditions smaller quantities of sulfur, selenium or tellurium will be absorbed in the target plate than in the first-mentioned case.

*Example VIII*

This method corresponds for the major part with the method described in Examples III and V, wherein lead monoxide was deposited on the signal electrode in a pure oxygen atmosphere, after which the deposited layer was exposed to an atmosphere containing in addition to oxygen also water vapor and finally a processing that followed, to wit, either a small additional quantity of lead monoxide was deposited again in an atmosphere containing substantially only oxygen, or the free surface of the target plate was exposed to an oxygen bombardment, with which the surface of the target plate was given the desired p-type conductivity. Instead of exposing the target plate as deposited in the first step to an atmosphere containing only oxygen and water vapor the target plate was exposed according to the present example to an atmosphere which differs from that previously mentioned in that the water vapor was wholly or partly replaced by sulfurated hydrogen, seleniated hydrogen or tellurated hydrogen. The overall pressure of the gas to which the deposited layer was exposed may be $500\times10^{-5}$ mm. Hg; 30 to 40% thereof being due to the water vapor, if any and one of the other mentioned hydrogen compounds. Since these other hydrogen compounds are more reactive than water vapor (the reactivity increases in the order of succession mentioned above), either lower partial pressures or shorter durations of the thermal treatment or lower temperatures may suffice in order to obtain a homogeneous target plate. A few possibilities are given below: total gas pressure 100 to $200\times10^{-5}$ mm. Hg; 30 to 40% thereof being due to a water-forming gas mixture consisting of equal quantities of water vapor and sulfurated hydrogen; temperature of the treatment 100 to 200° C., duration 30 to 15 minutes.

When the deposited layer was exposed to an atmosphere of oxygen and sulfurated hydrogen only (the latter being responsible for 30 to 40% of the overall pressure) the purpose aimed at was attained with an overall gas pressure of 100 to $500\times10^{-5}$ mm. Hg, if with a temperature of the layer of 15 to 50° C., the duration of the exposure has been chosen to be about 20 minutes at the lower temperature and not much more than 6 minutes at the higher temperature. If, instead of sulfurated hydrogen, seleniated hydrogen is used a fairly low overall pressure of the gas atmosphere on the low side, or a temperature on the low side or a shorter duration suffices.

All methods according to the invention described in the preceeding examples, can provide photoconductive camera tubes having an adequate low photoconductive lag (in other words sufficiently high speed of response) for taking live scenes; hitherto this requirement has given rise to many difficulties with this type of pick-up tube. A further advantageous factor is that the maximum permissible dark current, which in practice is set at $5\times10^{-9}$ A. occurs only after at least a few hundred hours of operation. It has been found in particular that the methods described in the Examples I (in particular in utilizing an overall pressure of about 1000 to $1500\times10^{-5}$ mm. Hg, 40 to 20% thereof being due to the water-forming gas) II, VI and VII can provide, in a reproducible manner, camera tubes having a lifetime exceeding considerably that of the known camera tubes. This lifetime may even reach 1000 or more hours.

As stated above, the incorporation of sulfur, selenium and/or tellurium in the photosensitive layer improves the spectral sensitivity to long-wave radiation, so that with hydrogen compounds of these elements in the gas atmosphere in the deposition process of a lead monoxide target plate, or the action of a gas atmosphere on a deposited target plate, camera tubes can be obtained which are very suitable for use in color television systems. This improvement in the spectral sensitivity to long-wave radiation is the more pronounced, the more water vapor is replaced by sulfurated hydrogen, seleniated hydrogen, tellurated hydrogen or a mixture thereof. The use of seleniated hydrogen or tellurated hydrogen instead of sulfurated hydrogen provides a spectral sensitivity curve, which as compared with the curve obtained with sulfurated hydrogen, exhibits a higher sensitivity to red light. By the choice of the water-forming gas (composition, relative and overall pressure) the spectral sensitivity curve of the camera tube manufactured by using such gas in accordance with the invention may be made to match to a greater or lesser extent given operational conditions. It should be noted that for use in television studios, both sensitivities to red and blue are desired, while for use in the red or infrared region, the sensitivity to blue is practically never required.

*Example IX*

In order to obtain the higher sensitivity to long-wave radiation by using sulfurated, seleniated or tellurated hydrogen or a mixture thereof in the gas atmosphere in which the layer is deposited or to which the deposited layer is exposed in a separate treatment, it is not necessary for the said gas to be present at the beginning of the vapor-deposition process or of the exposure in the gas atmosphere used. For instance, the vapor-deposition of the photo-sensitive layer may be performed in an atmosphere containing oxygen and water vapor as described in Example I and the deposited layer may be exposed subsequently for some time to an atmosphere containing sulfurated hydrogen or one of the other hydrogen compounds referred to above. In this stage, a small quantity of this gas diffuses into the layer and thus provides the increase in sensitivity. Any detrimental effect of this diffused gas on the electrical properties of the surface layer may be compensated subsequently by an oxygen bombardment of said surface layer.

Also in the method in which, as described in Example V the photosensitive layer after having been deposited for at least the major part, was exposed to a gas atmosphere containing apart from oxygen water vapor, a further treatment in an atmosphere containing sulfurated, seleniated or tellurated hydrogen may follow, after which preferably by means of an oxygen bombardment any harmful effect on the electrical properties of the surface layer were compensated. Such an oxygen bombardment may also be carried out in an earlier stage, that is prior to the exposure of the layer to an atmosphere containing one of the above hydrogen compounds other than water vapor, and subsequent to exposure of the layer to an atmosphere consisting of oxygen and water vapor only. This bombardment may then be repeated after the exposure of the layer to the atmosphere comprising said hydrogen compound. Since the oxygen bombardment introduces an adequate quantity of oxygen in the surface layer of the photosensitive layer, it is often not necessary for the atmosphere containing the aforesaid hydrogen gas other than water vapor to contain in addition oxygen.

The following exemplary data may illustrate the present example. A photosensitive layer deposited as described in Example IV in a gas atmosphere containing oxygen and water vapor was exposed, prior to or after an oxygen bombardment by means of a gas discharge as described in that example, for 5 to 10 minutes to a gas atmosphere consisting mainly of sulfurated hydrogen at a pressure of about 150 to $275\times10^{-5}$ mm. Hg. The window during this exposure was held at room temperature. A higher temperature may be used but at such higher temperature the duration of the exposure should be reduced. The gas atmosphere may contain apart from the sulfurated hydrogen oxygen at a pressure of for example about 50 to $100\times10^{-5}$ mm. Hg, but this is not necessary, if the exposure to the atmosphere of sulfurated hydrogen is preceded by an oxygen bombardment described in Example IV, or if the oxygen bombardment to which the layer is subjected after the exposure so that the sulfurated hydrogen atmosphere is more intensive than is described in Example IV. It is advisable always to perform an oxygen bombardment after the exposure to the sulfurated hydrogen atmosphere in order to be quite sure that the surface of the layer has the desired p-type conductivity. Any presence of oxygen in the atmosphere containing the sulfurated hydrogen may result in that a lower intensity of the last oxygen bombardment is sufficient. It should be noted that instead of sulfurated hydrogen use may be made of seleniated or tellurated hydrogen or a mixture of these gases, in which case because of the greater activity of these gases a shorter duration of the exposure, a lower temperature of the window and/or a lower partial pressure of the hydrogen compound in the gas atmosphere is sufficient.

Favorable results were obtained, when the aforesaid process was carried out with a photosensitive layer obtained by the vapor-deposition of lead monoxide in a gas atmosphere, the pressure of which was 1000 to $1500\times10^{-5}$ mm. Hg and which contained both oxygen and water vapor, to an extent such that their partial pressures had the ratio of 7:6; the water vapor pressure need not be reduced during the deposition process, which means that this ratio may be maintained throughout the deposition process.

By subjecting a photosensitive layer which in accordance with the invention consists of a metal-oxygen compound and was either deposited in a gas atmosphere containing oxygen and water vapor or was exposed to such an atmosphere, in order of succession to an oxygen bombardment, to a treatment in a water-forming gas as described above and then again to an oxygen bombardment, the layer can be given a composition which in going from the free surface in the direction of the support results in, a p-i-(n)-(i)-p structure, in which the possible presence of the (n) and the (i) region results from a lower degree of compensation of the water-forming gas absorbed in the last treatment in a gas atmosphere by the oxygen introduced into the surface by the oxygen bombardment. It will be obvious that by repeating the sequence of oxygen bombardment and exposure to a gas atmosphere containing water-forming gas—in view of a desirable sensitivity to red-use is preferably made of sulfurated, seleniated, tellurated hydrogen or a mixture thereof—although water vapor may also be used—a multiple p-i-(n)- structure can be obtained, the thickness of the i-zone being each time fairly considerable, which involves a comparatively high sensitivity and a minimized photoconductive lag.

It has been stated earlier that presumably one of the causes of the deterioration of a camera tube having a photosensitive target plate which consists mainly of a metal-oxygen compound, in the course of its operation, resides in the loss of oxygen from the surface of the target plate scanned by the electron beam. This loss of oxygen may have different causes, for example: transfer of oxygen to the vacuum, since the pressure of the oxygen in the state of equilibrium at the surface is constantly reduced by the getter in the tube; the release of oxygen by impact of electrons; the reducing effect of ions or atoms of high thermal velocity produced by the electron beam in the tube; and photolysis of the photosensitive material due to the incident light on the layer in conjunction with the residual gases in the tube. Also the vacuum in the tube may contain n-forming elements which may adversely affect the desired p-type conductivity of the surface layer of the target plate. In order to reduce the effect of these factors, or to obviate them for the major part, it would be desirable to protect the photosensitive layer from the vacuum. It has been found that this can indeed be realized and that in such way a further improvement in lifetime is obtained. According to this aspect of the invention, the photosensitive layer is provided on the side remote from the support with a thin layer of practically insulating or slightly p-type conducting material, which layer is denser (less porous) than the photosensitive layer proper. This protecting layer of which the thickness may be about $1\mu$, preferably consists of the same metal-oxygen compounds as present in the photosensitive layer, and exhibits a glassy structure, such as is obtained by vapor-deposition upon a substratum having a comparatively low temperature.

In the Examples I to II such a protecting layer of lead monoxide can be obtained by the vapor-deposition of a last layer of lead monoxide in an atmosphere containing substantially only oxygen, while the window is held at a temperature below for example 40° C. This protecting layer may be vapor-deposited in addition after the photosensitive layer proper has been deposited and treated in accordance with the examples described above, with the exception, however, of the vapor-deposition of an extremely thin layer of silver or other suitable metal, which does not exhibit transverse conductivity. It is also possible to form this layer during the vapor-deposition, or the completion of the vapor-deposition of the photo-sensitive layer itself by reducing the temperature of the support to below about 40° C. during the vapor-deposition of the last part of the layer. Such a possibility has been described at the end of Example III. When an oxygen bombardment is carried out, this may be done after the deposition of the protecting layer. When the distinctly p-type conducting surface layer of the target plate is obtained by the vapor-deposition of lead monoxide doped with a small quantity of thallium of other suitable p-forming element (see Example II), the resulting doped surface layer itself may operate as a protecting layer, if during the deposition of said doped surface layer the window is held at the aforesaid lower temperature. If, furthermore, an extremely thin metal layer, not exhibiting transverse conductivity, is desired on the target plate, this may be vapor-deposited on the protecting layer. The protecting layer may consist, not only of the metal-oxygen compound used for the photosensitive layer, but also of a practically insulating material, for example silicon monoxide (SiO), which must be sufficiently thin to allow electrons or holes to pass through.

As an alternative, a photosensitive material differing from the metal-oxygen compound of the photosensitive layer proper may be used for the protecting layer, to the extent that this material can be vapor-deposited in the form of a substantially non-porous layer. For example a thin layer of antimony trisulphide ($Sb_2S_3$) or selenium (Se) may be vapor-deposited by an additional process on a target plate deposited and treated by a method as described in any of the Examples I to VIII, such target plate, however, not having been provided with an extremely thin nickel layer on its surface as described in these examples.

In the foregoing, the invention has been described with reference to examples referring to camera tubes of the vidicon type, having a photosensitive, in fact photoconductive, target plate consisting mainly of lead monoxide. It should be noted that the invention is neither restricted to camera tubes of the said kind, nor to the use of lead monoxide.

Other photosensitive materials consisting of a compound of one or more metals with oxygen and which can be rendered, at will, n-type or p-type conducting are suitable for the methods according to the invention in a similar manner. In the examples given above, bismuth trioxide ($Bi_2O_3$) or zinc oxide (ZnO) may be used instead of lead monoxide.

FIGS. 6 and 7 illustrate an embodiment of a photoconductive cell provided with linear electrodes. It should be noted that for the sake of clarity, various dimensions are not shown in the correct ratio. For dimensions which are of interest possible practical values are given below.

The cell illustrated with FIG. 6 which shows a part of a transverse section of this cell, comprises a plate-shaped support 200 of glass, one side of which is provided with alternating parallel extending straight electrodes 202 and 203. The electrodes 202, which are electrically interconnected, may consist of conductive tin oxide or vapor-deposited silver and have a width of about 20$\mu$. The electrodes 203, which are also electrically interconnected and have the same width as the electrodes 202, consist of nickel or platinum vapor-deposited on the support 200 to a thickness of about 20$\mu$. The distance between the centers of consecutive electrodes (202, 203) is about 500$\mu$, but may be much larger, for example 1000$\mu$. Over each pair of adjacent electrodes 202 and 203 there extends a path 204 of photoconductive material, following the direction of these electrodes and obtained by vapor-deposition, while consecutive paths are separated by a non-covered surface strip 207 of the support 200. In operation of the photoconductive cell, the electrodes 202 should be positively biased with respect to the electrodes 203 whereby the electrodes constitute the positive current supply members and the electrodes 203 the negative supply members to the photoconductive material.

In accordance with the invention, the paths 204, each having a thickness of about 10 to 30$\mu$, mainly consist of a photoconductive metal-oxygen compound which can be rendered, at will, n-type or p-type conductive (and hence also intrinsically conductive). During the vapor-deposition process, or during a thermal treatment preceding one or more final stages of the manufacture of the paths, water-forming gas as described above and an excess quantity of oxygen compensating at least the effect of said gas on the electrical properties of the photoconductive material are incorporated therein. By far, the major part of each path, i.e. a longitudinal strip 205 which extends, in its transverse direction, from across the electrode 202 to the proximity of the electrode 203 consists of material having substantially intrinsic conductivity or slight p-type conductivity, since the water-forming gas absorbed there is, at least, compensated, but not distinctly over compensated by additionally absorbed oxygen. The remaining portion 206 of a path 204, contacting the electrode 203, has, however, distinctly p-type conductivity, at least as far as the photosensitive material covering the electrode 203 is concerned. The paths 204 are located in a hermetically closed space limited by the support 200 and a cup-shaped lid 201, bearing thereon and connected with the rim thereof, which lid may be made of glass, or instead thereof of suitable ceramic material, or a metal (for example aluminum). The closed space comprising the paths 204 may be exhausted, but it is advantageous to provide an oxygen atmosphere at a pressure of about 10 to $100\times10^{-5}$ mm. Hg.

The p-type conducting portion 206 of the photoconducting path 204, covering the electrode 203, may be obtained by a method similar to one of the methods providing, as described in Examples I to IX a p-type conducting surface layer of a target plate of a camera tube, while prior or subsequent thereto the larger, intrinsic conducting portion 205, covering the electrode 202, may similarly be obtained by one of the methods described in said examples.

FIG. 7 illustrates a method in which the portion 206 was vapor-deposited last, while the portion 205 of the paths 204, which covers the electrode 202 and extends closely to the electrode 203, was gradually vapor-deposited starting from an electrode 203, use being made of a mask 210, which was movable during the vapor-deposition process. This mask was provided with parallel narrow slots 211, which are parallel to the electrodes 202 and 203, the distance between these slots being equal to the distance between the electrodes 202. The slots 211 may have a width of 50 to 100$\mu$ and may be etched in the plate 210, preferably so that their section tapers towards that side of the plate 210 which faces the support 200, when the mask is in use. The support 200 was used with the electrodes 202 and 203 on the inner side, as a closure-member of an evaporation vessel comprising a holder with the metal-oxygen compound to be deposited on the support, for example lead monoxide. The evaporation vessel and the holder are not shown in FIG. 7 for the sake of simplicity. Closely in front of the support 200 and between this support and the holder mask 210 was arranged so as to be movable so that it could be moved slowly and uniformly parallel to the support and at right angles to the direction of the electrodes 202 and 203. At the beginning of the vapor-deposition of the metal-oxygen compound (the direction of the vapor is indicated in FIG. 7 by the arrows D) the place of the mask 210 was such that the slots 211 were located substantially opposite the electrodes 202 or (as shown in FIG. 7) slightly on the left-hand side thereof. During the vapor-deposition of the metal-oxygen compound on the support 200, which latter could be cooled by means of a coolant 212 on the outer upper side, the mask 210 was moved slowly and uniformly in the direction indicated in FIG. 7 by the arrow B, so that a path 205 of uniform thickness was formed on the electrode 202 and adjacent thereto, this path extending transversely almost up to the first-following electrode 203 as viewed in the direction of movement of the mask 211. The vapor-deposition process was carried out either in a gas atmosphere containing oxygen and a water-forming gas as indicated in one of the Examples I, II or VI, the partial pressure of the water-forming gas being reduced during the process, or in an atmosphere containing substantially only oxygen as indicated in the Examples III and V. After the portions 205 of the paths 204 had thus been deposited, the remaining portions 206 were deposited, in which step the mask 210 was moved onwards in the direction B so that these portions 206 covered the electrodes 203. The vapor-deposition of the portions 206 could have been performed in the first above-mentioned case (deposition of the portions 205 in an oxygen and water-forming gas containing atmosphere) following the deposition of the portions 205; in the second case the deposited portions 205 were first treated as described in Examples III, V and in the corresponding variants of Example VIII, in an atmosphere containing, in addition to oxygen, a water-forming gas, after which the portions 206 were vapor-deposited. The portions 206 were deposited by the method described for the last part of the target plate of a camera tube as described in any of the Examples I, II and III and in the corresponding variants of the further examples, however, with the exception of the indicated vapor-deposition of an extremely thin metal layer exhibiting no transverse conductivity.

The process could have been reversed, that is first the portions 206 could have been provided, and only then the intrinsic conducting portions 205 of the paths.

For instance with the aid of a mask, which, in contrast to the mask 211 of FIG. 7, need not be displaced during the deposition process and which is disposed on the support, first a layer of a thickness of 1$\mu$ or of a few microns of a photoconducting metal-oxygen compound capable of being rendered at will p-type conducting or n-type conducting may be vapor-deposited at the area of the electrodes 203. The deposition was carried out in an atmosphere containing substantially only oxygen, after which the deposited material was bombarded, in the manner described in Example IV, with oxygen ions or thermally rapidly moving oxygen atoms so that at least the surface of the layer remote from the support was rendered distinctly p-type conducting. Then onto the support were vapor-deposited the portions 205 extending over the electrodes 202 and joining the first deposited, bombarded layer in the manner described with reference to FIG. 7 for the first case, use thus being made of a gas atmosphere containing apart from oxygen, a water-forming gas or gas mixture. In this step, the vapor-deposition of the metal-oxygen compound may, by using a stationary mask having comparatively wide slots, be restricted in area to the regions extending from an electrode 202 to the layer on one of the adjacent electrodes 203 deposited in the first step, and subsequently oxygen-bombarded. However, since the first deposited and oxygen-bombarded layers on the electrodes 203 cover these electrodes completely, the whole surface, that is including the material deposited in the first step, may have the photoconductive material deposited thereon. The photoconductive cell thus obtained is then no longer split up, as in the configuration of FIG. 6, into a number of parallel, extending paths, separated from each other by uncovered parts of the support, but it comprises a continuous layer of photoconductive material.

Instead of, or in conjunction with an oxygen bombardment of the photoconducting material applied to the areas of the electrodes 203, a p-forming element or a compound of such an element may be added to the metal-oxygen compound to be evaporated for obtaining said material, as is described in Example II with respect to the vapor-deposition of the last part of the target plate.

Therefore, while we have described the invention with reference to particular applications and embodiments thereof, other modifications will be apparent to those skilled in the art without departing from the spirit and scope of the invention as defined in the appended claims.

What is claimed is:

1. A method of manufacturing a photosensitive device comprising the steps, vapor-depositing in an atmosphere containing oxygen a layer of PbO on a support which is at a temperature between about 40° and 190° C., and subjecting the PbO to the action of an atmosphere not exceeding atmospheric pressure and comprising a mixture of oxygen and at least one gaseous compound selected from the group consisting of water-vapor, sulfurated hydrogen, seleniated hydrogen, and tellurated hydrogen, the partial pressure of said gaseous compound being initially about 20 to 80% of the sum of the partial pressures of the oxygen and said gaseous compound, said latter sum lying between $100 \times 10^{-5}$ and $2500 \times 10^{-5}$ mm. Hg.

2. A method as defined in claim 1 in which a nonporous, vitreous protective layer is deposited over the PbO layer on the side remote from the support.

3. A method of manufacturing a photosensitive device comprising the steps, vapor-depositing a layer of PbO on a support which is at a temperature between about 60° to 190° C. in an atmosphere having a pressure not exceeding $2500 \times 10^{-5}$ mm. Hg, said atmosphere comprising a mixture of oxygen and at least one gaseous compound selected from the group consisting of water-vapor, sulfurated hydrogen, seleniated hydrogen, and tellurated hydrogen, the pressure of said mixture being initially at least $100 \times 10^{-5}$ mm. Hg, 90 to 20% of said pressure being constituted by the partial pressure of the oxygen.

4. A method as defined in claim 3 in which a first portion of said layer is deposited in an atmosphere containing a first gaseous compound selected from the group consisting of water-vapor, sulfurated hydrogen, seleniated hydrogen, and tellurated hydrogen, and then a further portion of said layer is deposited in an atmosphere containing another gaseous compound selected from said group of gaseous compounds.

5. A method as defined in claim 3 in which the water-forming gas consists of a mixture of equal parts of hydrogen sulfide and water-vapor.

6. A method as defined in claim 3 in which the water-forming gas consists substantially of hydrogen sulfide at a partial pressure of 10 to 60% of total partial pressure of said latter atmosphere, said total pressure being about 200 to $700 \times 10^{-5}$ mm. Hg.

7. A method of manufacturing a photosensitive device comprising the steps, vapor-depositing a layer of PbO on a support which is at a temperature between about 60° and 190° C., in an atmosphere having a pressure between $1000 \times 10^{-5}$ and $2200 \times 10^{-5}$ mm. Hg and containing oxygen and the remainder principally a water-forming gas, the partial pressure of the water-forming gas being between 20 to 60% of the pressure of said atmosphere and being lower as the pressure of said atmosphere is higher.

8. A method of manufacturing a photosensitive device comprising the steps, vapor-depositing in an atmosphere containing oxygen a layer of PbO on a support which is at a temperature between about 40° to 190° C., and thereafter subjecting the PbO to the action of an atmosphere having a pressure not exceeding atmospheric pressure, said atmosphere comprising a mixture of oxygen and at least one gaseous compound selected from the group consisting of water-vapor, sulfurated hydrogen, seleniated hydrogen, and tellurated hydrogen, said mixture being initially between at least $100 \times 10^{-5}$ mm. Hg and $2500 \times 10^{-5}$ mm. Hg, about 80 to 50% of said pressure being constituted by the partial pressure of the oxygen.

9. A method as defined in claim 8 in which the atmosphere in which the layer is deposited contains a gaseous compound selected from the group consisting of water-vapor, sulfurated hydrogen, seleniated hydrogen, and tellurated hydrogen.

10. A method as defined in claim 8 in which the atmosphere contains an inert gas.

11. A method of manufacturing a photosensitive device comprising the steps, vapor-depositing a layer of PbO on a support which is at a temperature between about 40° and 190° C., and subjecting the PbO to the action of an atmosphere having a pressure not exceeding atmospheric pressure, said atmosphere comprising a mixture of oxygen and at least one gaseous compound selected from the group consisting of water-vapor, sulfurated hydrogen, seleniated hydrogen, and tellurated hydrogen, the pressure of said mixture being initially between $100 \times 10^{-5}$ and $2500 \times 10^{-5}$ mm. Hg, about 20 to 80% of said pressure being constituted by the partial pressure of the oxygen, and forming a region of p-type conductivity material in a surface portion of said layer.

12. A method as defined in claim 11 in which the region of p-type conductivity is formed by depositing thallium containing PbO.

13. A method as defined in claim 12 in which the thallium containing PbO is obtained by adding 0.5% by weight of a material selected from the group consisting of thallium and thallium oxide to the PbO which is being vapor-deposited to form said region.

14. A method as defined in claim 11 in which the region of p-type conductivity is formed by bombarding said surface portion with oxygen.

15. A method as defined in claim 14 in which the layer is bombarded with oxygen ions produced by an electrical discharge in an oxygen atmosphere.

16. A method as defined in claim 15 in which the pressure of the oxygen atmosphere, in which the electrical discharge is carried out, is about 4000 to $6000 \times 10^{-5}$ mm Hg.

17. A method as defined in claim 15 in which the PbO layer is an electrode for the electrical discharge.

18. A method as defined in claim 17 in which the PbO layer is illuminated to reduce its electrical resistance.

19. A method as defined in claim 11 in which the region of p-type conductivity is produced by bombarding the surface of the layer with oxygen and diffusing a water-forming gas thereinto.

20. A method of manufacturing a photosensitive device comprising the steps, vapor-depositing a layer of PbO on a support which is at a temperature between about 60° to 190° C., in an atmosphere having a pressure not exceeding $2500 \times 10^{-5}$ mm. Hg, said atmosphere comprising a mixture of oxygen and at least one gaseous compound selected from the group consisting of water-vapor, sulfurated hydrogen, seleniated hydrogen, and tellurated hydrogen, the pressure of said mixture being at least $150 \times 10^{-5}$ mm. Hg, 90 to 20% of said pressure being constituted by the partial pressure of the oxygen, and forming a region of p-type conductivity material in a surface portion of said layer.

21. A method of manufacturing a photosensitive device as defined in claim 20 in which the ratio of the partial pressures of the gaseous compound and the oxygen in the atmosphere is reduced during vapor-deposition of the layer.

22. A method as defined in claim 21 in which a portion of said layer adjoining a boundary surface thereof is deposited in an atmosphere in which the partial pressure of the water-vapor does not exceed $3 \times 10^{-5}$ mm. Hg to form the region of p-type conductivity material.

23. A method as defined in claim 21 in which the partial pressure of the oxygen in the atmosphere is maintained substantially constant.

24. A method as defined in claim 20 in which the region of p-type conductivity is formed by bombarding said surface portion with oxygen.

25. A method as defined in claim 24 in which the layer is bombarded with oxygen ions produced by an electrical discharge in an oxygen atmosphere.

26. A method as claimed in claim 25 in which the pressure of the oxygen atmosphere in which the electrical discharge is carried out, is about 4000 to $6000 \times 10^{-5}$ mm. Hg.

27. A method as defined in claim 25 in which the PbO layer is an electrode for the electric discharge.

28. A method as defined in claim 27 in which the PbO layer is illuminated to reduce its electrical resistance.

29. A method of manufacturing a television camera tube including an electron beam source and means for scanning a photosensitive target with said electron beam, comprising the steps of forming on the inside surface of a glass end wall of a cylindrical glass tube a transparent conductive layer constituting a positive electrical current connection for the target, and vapor-depositing in an atmosphere having a pressure not exceeding $2200 \times 10^{-5}$ mm. Hg a target layer of PbO on said conductive layer while said glass end wall is maintained at a temperature between about 60° and 190° C., said atmosphere comprising a mixture of oxygen and at least one gaseous compound selected from the group consisting of water-vapor, sulfurated hydrogen, seleniated hydrogen and tellurated hydrogen, the pressure of said mixture being initially at least $150 \times 10^{-5}$ mm. Hg, 80 to 40% of said pressure being constituted by the partial pressure of the oxygen, and forming a region of p-type conductivity material in that surface of the target layer that is remote from said conductive layer.

30. A method as defined in claim 29, in which the formation of the p-type conductivity material is obtained by bombarding the said surface of said target layer with oxygen ions produced by an electrical discharge in an oxygen atmosphere.

References Cited

UNITED STATES PATENTS

| | | | |
|---|---|---|---|
| 2,888,370 | 5/1959 | Damon et al. | 117—106 |
| 2,890,359 | 6/1959 | Heijne et al. | 313—65 |
| 3,003,075 | 10/1961 | Krieger et al. | 313—65 |

ALFRED L. LEAVITT, *Primary Examiner.*

A. H. ROSENSTEIN, *Assistant Examiner.*

UNITED STATES PATENT OFFICE
CERTIFICATE OF CORRECTION

Patent No. 3,372,056 March 5, 1968

Edward Fokko de Haan et al.

It is certified that error appears in the above identified patent and that said Letters Patent are hereby corrected as shown below:

Column 2, line 57, "place" should read -- plate --. Column line 18, "quanity" should read -- quantity --; line 45, "helium" should read -- television --. Column 9, line 8, "Hg and the" should read -- Hg. The --. Column 12, line 16, "20" should read -- 10 --; line 53, "thte" should read -- the --. Column 14, line 12, "sturcture" should read -- structure --. Column 17, line 57, "is" should read -- was --. Column 18, line 75, "as" should read -- was --. Column 23, line 17, "V" should read -- IV --. Column 24, line 9, after "hydrogen" insert -- or tellurated hydrogen --.

Signed and sealed this 19th day of August 1969.

(SEAL)

Attest:

Edward M. Fletcher, Jr.
Attesting Officer

WILLIAM E. SCHUYLER, JR.
Commissioner of Patents